(12) United States Patent
Sekiguchi

(10) Patent No.: US 6,690,438 B2
(45) Date of Patent: Feb. 10, 2004

(54) LIQUID CRYSTAL DISPLAY PANEL

(75) Inventor: Kanetaka Sekiguchi, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/827,293

(22) Filed: Apr. 6, 2001

(65) Prior Publication Data

US 2002/0145688 A1 Oct. 10, 2002

(51) Int. Cl.[7] .............................................. G02F 1/1335
(52) U.S. Cl. ....................................... 349/114; 349/106
(58) Field of Search ........................... 349/114, 43, 106

(56) References Cited

U.S. PATENT DOCUMENTS

| | | | | |
|---|---|---|---|---|
| 5,267,060 A | * | 11/1993 | Colton | 359/15 |
| 5,336,535 A | * | 8/1994 | Fukuchi et al. | 428/1.32 |
| 5,526,145 A | * | 6/1996 | Weber | 359/15 |
| 5,537,232 A | * | 7/1996 | Biles | 359/15 |
| 5,646,705 A | * | 7/1997 | Higuchi et al. | 349/143 |
| 5,822,029 A | * | 10/1998 | Davis et al. | 349/115 |
| 5,930,011 A | * | 7/1999 | Gambogi et al. | 359/15 |
| 6,317,181 B1 | * | 11/2001 | Hoshino | 349/98 |
| 2001/0020990 A1 | * | 9/2001 | Moon | 349/96 |

OTHER PUBLICATIONS

Ogawa et al, "Trends of Reflective LCDs for Future Electronic Paper", Proceedings of the SID, May 1998, pp. 217–220.*

* cited by examiner

*Primary Examiner*—Kenneth Parker
(74) *Attorney, Agent, or Firm*—Westerman, Hattori, Daniels & Adrian, LLP

(57) ABSTRACT

A liquid crystal layer (15) is sandwiched between a first substrate (1) provided on a visible side and a second substrate (5) opposed to the first substrate; a first color filter (9) is provided on the first substrate (1) or on the second substrate (5); a transflective reflector (24) is provided on the opposite side to the visible side of the first color filter (9), which transmits a part of light and reflecting almost all the remaining light; and a second color filter (28) is provided on the opposite side to the first color filter (9) with respect to the transflective reflector (24), thereby forming a liquid crystal display panel.

40 Claims, 9 Drawing Sheets

LIQUID CRYSTAL DISPLAY PANEL

BACKGROUND OF THE INVENTION

1. Field of the Invention

The present invention relates to a color translucent liquid crystal display panel made by providing color filters in a translucent liquid crystal display panel which is reduced in power consumption and is made capable of a reflection display to improve visibility when light (external light) in an external environment is strong, and also capable of a temporary transmission display by providing an auxiliary light source to improve visibility when the external light is weak.

2. Description of the Related Art

At present, as liquid crystal display devices using liquid crystal display panels, there are a transmissive liquid crystal display device having an internal light source, a reflective liquid crystal display device using light of an external light source, and a transflective liquid crystal display device using light of an external light source when it is bright and turning on an auxiliary light source when the external light source is dim to be used in a transmission state. The reflective liquid crystal display device is effective in order to reduce the power consumption of and to thin the liquid crystal display device. A reflection display, however, can not be recognized when the external environment is dark, and thus a transflective display is hopeful.

Such a conventional transflective liquid crystal display device is explained using FIG. 16. FIG. 16 is a view schematically showing a cross section of the transflective liquid crystal display panel in this liquid crystal display device. Incidentally, it is assumed that a visible side by an observer is the upper side.

This liquid crystal display panel includes a liquid crystal layer 15 sandwiched between a first substrate 1 and a second substrate 5 each of which is transparent. Further, the liquid crystal display panel has scanning electrodes 2 in stripes parallel to the paper surface, each made of an indium tin oxide (ITO) film which is a transparent conductive film, on the first substrate 1 (inner surface) provided on the viewer side. On the other hand, on the second substrate 5 (inner surface), a color filter 9 is provided which is constituted of red (R) filters 6, green (G) filters 7 and blue (B) filters 8. In this color filter 9, adjacent filters 6, 7 and 8 slightly overlap one upon another or abut on each other.

On the color filter 9, a protective insulating film 10 is formed to flatten levels of the color filters and prevent deterioration thereof. The protective insulating film 10 is provided thereon with data electrodes 11 in stripes perpendicular to the paper surface each made of an indium tin oxide (ITO) film that is a transparent conductive film. The scanning electrodes 2 and the data electrodes 11 are formed in directions perpendicular to each other to form pixel portions where they coincide as viewed in a plane view, and a plurality of the pixel portions form a display region.

Further, alignment films 12 are provided on the inner surface of the first substrate 1 including the scanning electrodes 2 and on the inner surface of the second substrate 5 including the data electrodes 11 respectively as treatment films for aligning the liquid crystal layer 15 in predetermined directions. The first and second substrates 1 and 5 are coupled together with a fixed gap therebetween with a sealing material 16 so that the scanning electrodes 2 on the first substrate 1 and the data electrodes 11 on the second substrate 5 are opposed, a liquid crystal is injected from an opening (not shown) provided in the sealing material 16, and sealed with a closing material (not shown), thereby forming the liquid crystal layer 15.

Furthermore, a first polarizer 21 is provided on the visible side (upper side) of the first substrate 1, and a second polarizer 22 is provided on the opposite side (lower side) to the visible side of the second substrate 5. On the lower side of the second polarizer 22, a transflective reflector 24 is provided which transmits a part of light and reflects almost all the remaining light. Moreover, a light source portion 31 is provided below the transflective reflector 24 as an auxiliary light source. The light source portion 31 is constituted of, for example, a cold-cathode fluorescent tube, a reflector, a prism sheet and a diffuser.

In such a transflective liquid crystal display panel, light from the outside, for example, passes through the first polarizer 21 and the first substrate 1 as a first incident light 35, and is then made incident on the liquid crystal layer 15. The liquid crystal layer 15 causes optical rotation or phase difference, and the light is made incident on the color filter 9, passes through the second substrate 5 and the second polarizer 22, and reaches the transflective reflector 24. The first incident light 35 passes through such an optical path and is thus absorbed by the aforesaid members, resulting in attenuation of the light incident on the transflective reflector 24. The path of light is explained in relation to major constituents, and additionally the scanning electrodes 2 and the like actually cause absorption.

The first incident light 35 is reflected by the transflective reflector 24 and goes out to an observer side as a first reflection light 36, while absorbed by the second polarizer 22, the second substrate 5, the color filter 9, the liquid crystal layer 15, the first substrate 1 and the first polarizer 21. Therefore, the first reflection light 36 passes through the color filter 9 twice, and thus it is greatly absorbed by the color filter 9.

On the other hand, other light component from the external light source, as a second incident light 37, passes through a path similar to that of the first incident light 35 to reach the transflective reflector 24. The second incident light 37, which is a component passing through the transflective reflector 24, is slightly reflected by the constituent of the light source portion 31 disposed below the transflective reflector 24. This reflection light goes out as a second reflection light 38, but it becomes extremely weak reflection light because it is originally weak reflection light, and additionally, only a component of the light passes through the transflective reflector 24 when passing through it again, and it is absorbed by the constituents including the color filter 9.

As described above, when the external light source is used, the first and second incident lights 35 and 37 passes through the color filter 9 twice and go out to the observer side as the first and second reflection lights 36 and 38 to be recognized as a display.

In contrast to the above, emitted light from the light source portion 31 disposed below the second substrate 5 becomes a transmission light 40 which passes through the transflective reflector 24, the second polarizer 22, the second substrate 5, the color filter 9, the liquid crystal layer 15, the first substrate 1 and the first polarizer 21 to go out to the observer side. Accordingly, the transmission light 40 passes through the color filter 9 only once.

Consequently, brightness is important only in the case of the reflection display because the light going out to the observer side passes through the constituents twice and is thus absorbed greatly. It is particularly desired to use a color filter with little absorption because the light passes through the color filter twice.

Spectral characteristics of the color filter are explained here using FIG. 17. FIG. 17 is a graph showing spectral characteristics of the R, G and B color filters.

In FIG. 17, the horizontal axis represents optical wavelength in the unit nanometers (nm), and the vertical axis represents transmittance in the unit percent(%).

The spectral characteristic of the R, G and B filters used in the reflective liquid crystal display panel are represented by curved lines 66, 67 and 68, respectively. For example, the red (R) filter is required to have a high transmittance in a range from 600 nanometers (nm) to 800 nanometers (nm) as shown by the curved line 66 (chain line). Further, brightness is important as described above, and thus the red (R) filter is required to have a transmittance of about 40% also in a wavelength region of blue or green which is shorter than 600 nanometers (nm).

Similarly, the green (G) filter is required to have a high transmittance in a range from 500 nanometers (nm) to 600 nanometers (nm) as shown by the curved line 67 (solid line), and is required to have a transmittance of about 40% also in other wavelength region. The blue (B) filter is required to have a high transmittance in a range shorter than 500 nanometers (nm) as shown by the curved line 68 (broken line), and is required to have a transmittance of about 40% also in other wavelength region.

In contrast to the above, in the case of the transmission display, light passes through the color filter only once, and thus the above-described color filter used in the reflective liquid crystal display panel greatly decreases in chroma. Therefore, a color filter is employed, giving priority to chroma, in which its R, G and B color filters have spectral characteristics exhibiting high transmittances in narrow ranges (transmission wavelength regions), and exhibiting extremely low transmittances at other wavelengths as shown by curved lines 69, 70 and 71.

Because of the great difference in spectral characteristics of the color filter required in the reflection display and the transmission display as described above, the transflective liquid crystal display panel for performing both the reflection and transmission displays can not employ the color filter which satisfies both the requirements, presenting a problem that the display quality is necessarily decreased.

Further, formation of a region between the electrodes where the transmittance of the liquid crystal can not be controlled allows transmission light to leak from the region, decreasing display quality. Therefore, the region is normally shielded from light using a black matrix having a light shielding property. However, the use of the color filter having the black matrix for the reflective liquid crystal display panel decreases the reflectance in the black matrix region, presenting a problem of occurrence of a decrease in brightness.

In order to solve the above problems, there is a so-called front lighting method in which the light source portion is not provided below the second substrate, but light is introduced from around the first substrate to apply the light from above the first substrate. When the light is used as the light source for the reflection display, a light guide plate disposed above the first substrate 1 decreases display quality. Further, light made incident on the liquid crystal display panel is poor in uniformity, resulting in a display with nonuniform brightness.

Moreover, in the front lighting method, the light guide plate requires a thickness of several millimeters (mm) or more. Accordingly, when an input is conducted on a screen of the liquid crystal display panel, the display and an input portion are deviated from each other depending on a viewing angle due to the thickness of the light guide plate, presenting a problem in operability.

SUMMARY OF THE INVENTION

An object of the present invention is to solve the above-described problems and to provide a liquid crystal display panel capable of performing a bright display with excellent chroma either for a reflection display or for a transmission display.

In order to attain the above object, the present invention provides a liquid crystal display panel structured as follows.

A first substrate is provided on a visible side; a second substrate is provided opposed to the first substrate; a liquid crystal layer is sandwiched between the first substrate and the second substrate; a first color filter is provided on the first substrate or on the second substrate; a transflective reflector for transmitting a part of light and reflecting almost all the remaining light is provided on the opposite side to the visible side of the first color filter; and a second color filter is provided on the opposite side to the first color filter with respect to the transflective reflector.

In such a liquid crystal display panel, it is preferable to provide a transmitting hole portion with a high transmittance and a reflecting portion with a high reflectance in the transflective reflector.

Further, in this case, it is preferable that when signal electrodes are provided on the first substrate, and opposed electrodes are provided on the second substrate to form pixel portions where the signal electrodes and the opposed electrodes coincide as viewed in a plane view, the transmitting hole portion of the transflective reflector is provided inside the pixel portion.

Further, it is preferable that the second color filter is constituted of filters of a plurality of colors and is provided with overlapping portions where the filters of adjacent colors overlap one upon another are provided between the pixel portions.

Furthermore, it is preferable that the first color filter is also constituted of filters of a plurality of colors and is provided with overlapping portions where the filters of adjacent colors overlap one upon another are provided between the pixel portions.

Alternatively, it is possible to provide a transflective reflector removed portion without providing the transflective reflector around a display region constituted of a plurality of the pixel portions.

In this case, it is preferable that the filters of different colors are arranged in the first color filter and the second color filter within a region of the transflective reflector removed portion.

Alternatively, the second color filter may be formed by laminating the filters of a plurality of different colors within a region of the transflective reflector removed portion.

It is also possible to provide a light shielding member having a reflectance lower than that of the transflective reflector and a light shielding property on the first substrate or on the second substrate within a region of the transflective reflector removed portion.

It is preferable that the transflective reflector has irregularities on a front face thereof and has a light diffusing property.

It is preferable to provide the transflective reflector on a surface on the visible side of the second substrate.

In this structure, it is preferable to provide the second color filter and the transflective reflector on a surface on the visible side of the second substrate in an order of the second color filter and the transflective reflector from the second substrate side.

Alternatively, it is also possible to provide the transflective reflector on the opposite side to the visible side of the second substrate, and the second color filter on the opposite side to the second substrate with respect to the transflective reflector.

It is possible that the second color filter is provided contacting a surface on the opposite side to the visible side of the transflective reflector.

It is preferable that the first color filter and the second color filter have substantially the same pixel pitch.

Further, it is preferable to arrange these color filters so that the filters of the same color coincide as viewed in a plane view.

It is preferable that the transflective reflector is a reflector having an optical polarizing property.

Further, it is preferable that the first color filter and the second color filter have aligning marks respectively.

It is also possible to provide a light shielding layer between the color filters constituting the second color filter.

It is also possible to provide a first polarizer on the visible side of the first substrate, a second polarizer on the opposite side to the visible side of the second substrate, and a white diffuser between the first substrate and the first polarizer.

It is possible to provide switching elements on the liquid crystal layer side of the second substrate, wherein the switching element and the transflective reflector are connected.

The liquid crystal layer may be constituted of a scattering liquid crystal, in which an ultraviolet cut film for absorbing or reflecting ultraviolet light is preferably provided on the visible side of the first substrate, and the second substrate is preferably constituted of a transparent plastic substrate or plastic film substrate.

In the liquid crystal display panel thus structured, incident light passes through the first color filter twice to go out to the visible side when the reflection display is performed, and emitted light from the light source passes through the second color filter and the first color filter once to be emitted to the visible side when the transmission display is performed.

Therefore, by using a first color filter having spectral characteristics giving priority to brightness for the reflection display and a second filter having spectral characteristics giving priority to chroma for the transmission display, the chroma when the transmission display is performed can be improved without expense of the brightness when the reflection display is performed. Consequently, display quality can be improved in both the reflection display and the transmission display.

The provision of the reflecting portion and the transmitting hole portion in the transflective reflector facilitates the control of the transmittance and the reflectance, and enables the control of the transmittance without changing wavelength dependency of the transmittance.

Further, the provision of the overlapping portions in the color filter enables improvement in contrast as in the case of the block matrix being provided without increasing the number of processing steps or complicating the structure.

The contrast can also be improved by providing the transflective reflector removed portion and covering it with the color filters of a plurality of colors or the light shielding member, and these members can be used as panel covers, thus omitting the step of forming a panel cover.

Further, the transflective reflector is provided on the opposite side (lower side) to the visible side of the second substrate, and the second color filter is provided on the lower side of the transflective reflector, thereby carrying out the present invention with little change in structure of the conventional liquid crystal display panel.

The second color filter and the transflective reflector, which are provided on the visible side (upper side) of the second substrate, can be located closely to the first color filter, thereby preventing occurrence of parallax and decreases in color purity and brightness.

The pixel pitches are made substantially equal and arrangement of colors are made the same in the first color filter and the second color filter, thereby enabling prevention of color mixture. Further, the provision of the white diffuser on the upper side of the first substrate enables improvement in viewing angle characteristics.

It is especially effective to use a material having polarizing characteristics for the transflective reflector in the case of the liquid crystal display panel using the polarizer and the transflective reflector because it is possible to decrease the gap between the first color filter and the second color filter and to thin the liquid crystal display panel.

Moreover, since the mutual positional relation between the first color filter and the second color filter is important, it is effective to provide the aligning marks enabling mutual alignment.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, embodiments of the present invention will be described with reference to the drawings.

<First Embodiment>

Figure 1:
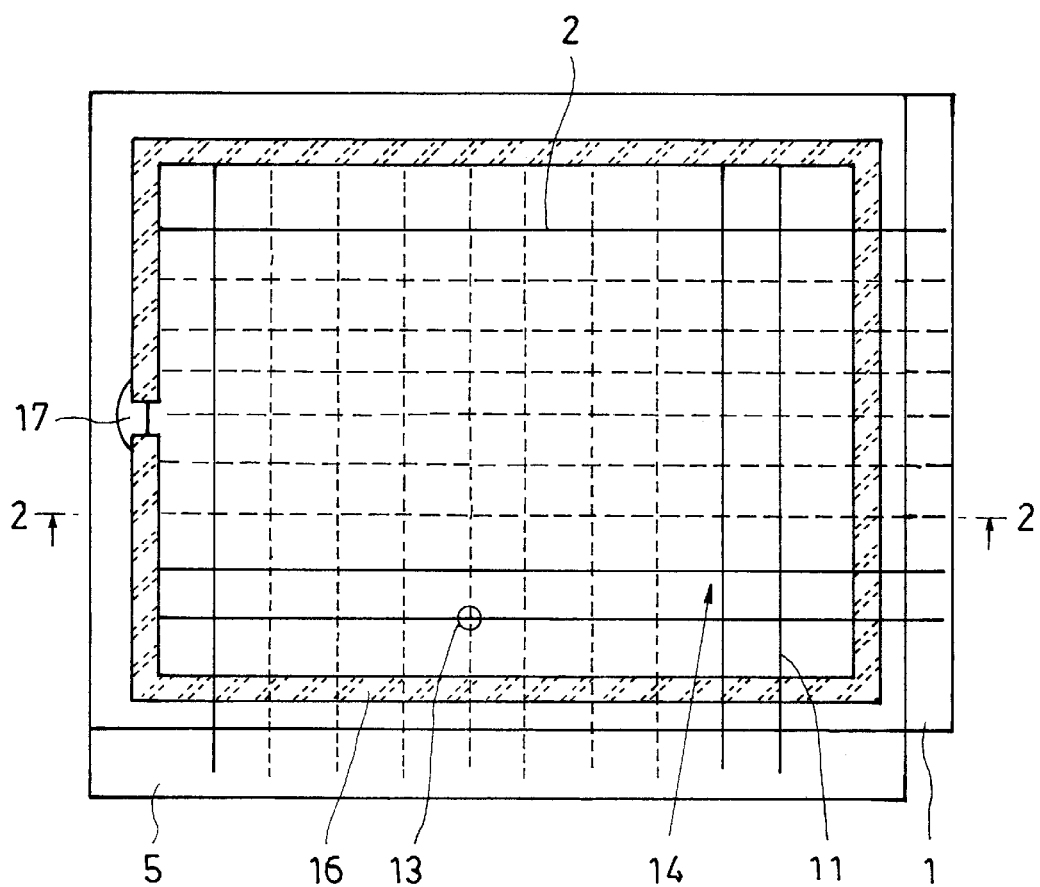
FIG. 1 is a schematic plane view of a liquid crystal display panel of a first embodiment of the invention.
Figure 2:
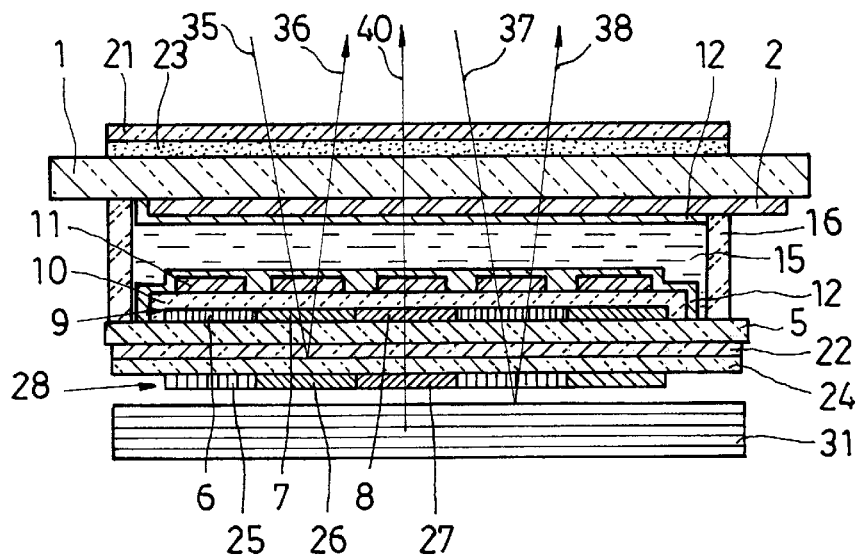
FIG. 2 is a cross-sectional view taken along a line 2—2 in FIG. 1.
Figure 16:
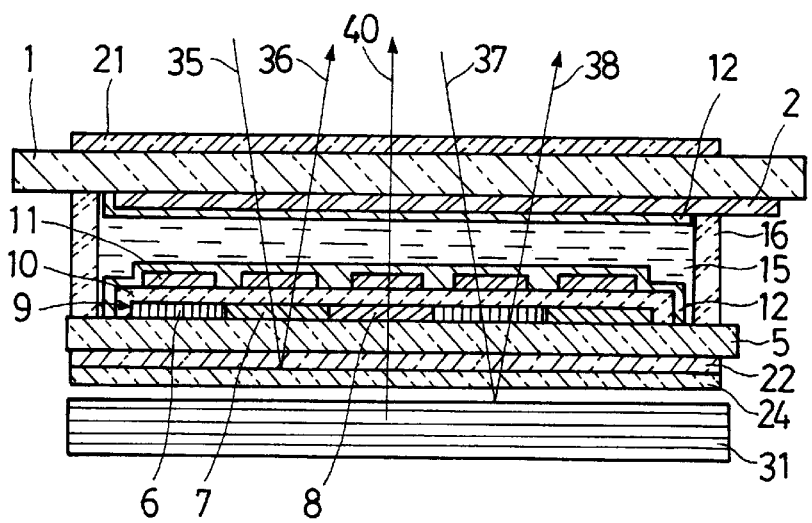
FIG. 16 is a schematic cross-sectional view showing a structure of a conventional liquid crystal display panel.
Figure 17:
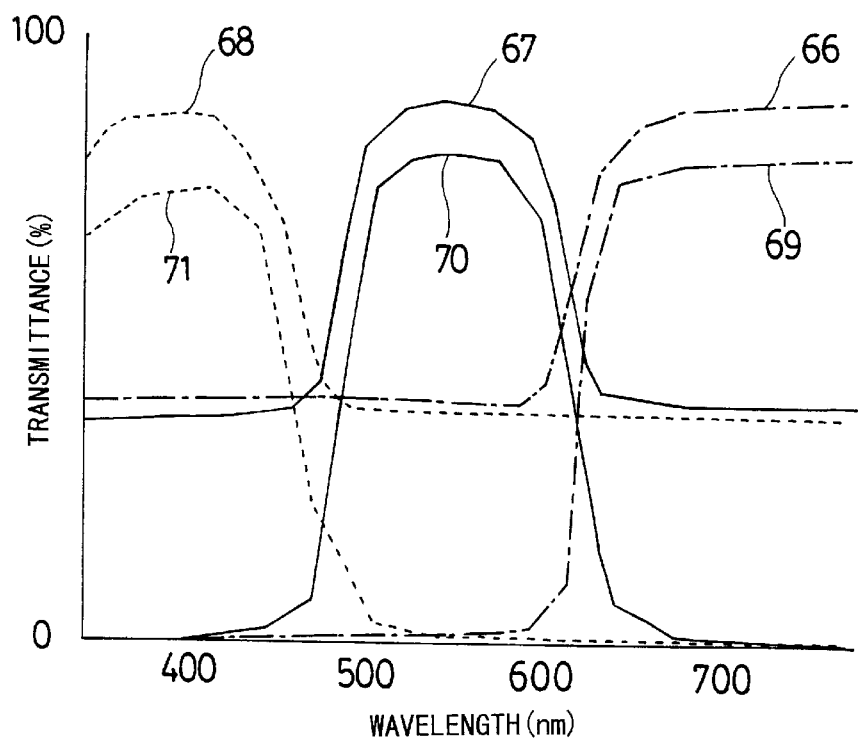
FIG. 17 is a graph showing spectral characteristics of color filters used in the liquid crystal display panel.

First, a liquid crystal display panel of the first embodiment of the invention is explained using FIG. 1, FIG. 2 and FIG. 17. FIG. 1 is a schematic plane view of the liquid crystal display panel. FIG. 2 is a schematic cross-sectional view taken along a line 2—2 in FIG. 1. In these figures, the same numerals are given to portions corresponding to those in FIG. 16 used in the explanation of the conventional example.

Incidentally, it is assumed that the upper side is the visible side in each cross-sectional view used for the explanation below.

The liquid crystal display panel of this embodiment includes a liquid crystal layer 15 sandwiched between a first substrate 1 and a second substrate 5 which are transparent glass substrates. Further, scanning electrodes 2 in stripes, each made of an indium tin oxide (ITO) film which is a transparent conductive film, are provided on the first substrate (inner surface) which is provided on the visible side.

The second substrate 5 which is opposed to the first substrate 1 with a predetermined gap interposed therebetween has a thickness of 300 micrometers ($\mu$m). It is possible to experimentally thin the second substrate 5 to 100 micrometers ($\mu$m), but one with a thickness of 300 micrometers ($\mu$m) is used in consideration of stability in a step of forming a first color filter 9.

On the second substrate 5 (inner surface), the first color filter 9 is first provided which is composed of red (R) filters 6, green (G) filters 7 and blue (B) filters 8. In this first color filter 9, adjacent filters 6, 7 and 8 slightly overlap one upon another or abut on each other.

On the first color filter 9, a protective insulating film 10 made of an acrylic resin is provided to flatten levels of the color filters and to prevent deterioration thereof. Further, data electrodes 11 in stripes, each made of an indium tin oxide (ITO) film as a transparent conductive film, are provided on the protective insulating film 10. The scanning electrodes 2 and the data electrodes 11 are formed in directions perpendicular to each other to form pixel portions 13 where they coincide as viewed in a plane view, and a plurality of the pixel portions 13 form a display region 14.

Further, alignment films 12 as treatment films for aligning the liquid crystal layer 15 in predetermined directions are provided on the inner surface of the first substrate 1 including the scanning electrodes 2 and on the inner surface of the second substrate 5 including the data electrodes 11. The first substrate 1 and the second substrate 5 are coupled together with a fixed gap interposed therebetween with a sealing material 16 in such a manner that the scanning electrodes 2 on the first substrate 1 and the data electrodes 11 on the second substrate 5 are opposed, and a liquid crystal is injected though an opening provided in a sealing material 16 and sealed with a closing material 17, thereby forming the liquid crystal layer 15.

Further, a diffuser 23 in a film form made by mixing beads with different refractive indices in an acrylic resin and a first polarizer 21 are provided on the visible side (upper side) of the first substrate 1. The diffuser 23 may be an adhesive containing a scattering material and also serve as an adhesive used for bonding the first polarizer 21 and the first substrate 1, or a white diffuser. Further, a second polarizer 22 is provided on the opposite side (lower side) to the visible side of the second substrate 5. Furthermore, on the lower side of the second polarizer 22, a transflective reflector 24 is provided which transmits 10% of incident light and reflects almost all the remaining.

Further, a second color filter 28 is provided to contact the lower face of the transflective reflector 24, in which its pixel pitch is the same as that of the first color filter 9 and its color filters are arranged at positions where they coincide with filters of the same colors of the first color filter 9 as viewed in a plane view. More specifically, the second color filter 28 is provided in such an arrangement that the R filters 6 of the first color filter 9 overlie R filters 25 of the second color filter 28, and similarly, the G filters 7 overlie G filters 26, and the B filters 8 overlie B filters 27, respectively.

Below the second color filter 28, a light source portion 31 is provided as an auxiliary light source. The light source portion 31 is constituted of, for example, a cold-cathode fluorescent tube, a reflector, a prism sheet, and a diffuser. Alternatively, the light source portion 31 may be constituted of an electro-luminescent (EL) element that is thin and has relatively low power consumption.

In such a transflective liquid crystal display panel, light from the outside, for example, passes through the first polarizer 21 and the first substrate 1 and is then made incident on the liquid crystal layer 15 as a first incident light 35. The liquid crystal layer 15 causes optical rotation or phase difference, whereby the light is made incident on the first color filter 9, passes through the second substrate 5 and the second polarizer 22 and reaches the transflective reflector 24. The first incident light 35 passes through such an optical path and is thus absorbed, resulting in great attenuation of the light incident on the transflective reflector 24. The path of light is explained in relation to major constituents, and further the scanning electrodes 2 and the like actually cause absorption.

The first incident light 35 is reflected by the transflective reflector 24 and goes out to an observer side, as a first reflection light 36, while absorbed by the second polarizer 22, the second substrate 5, the first color filter 9, the liquid crystal layer 15, the first substrate 1 and the first polarizer 21. Therefore, the first reflection light 36 passes through the first color filter 9 twice, and thus it is greatly absorbed by the first color filter.

On the other hand, other light component from the external light source passes through a path similar to that of the first incident light 35 to reach the transflective reflector 24 as a second incident light 37. The second incident light 37, which is a component passing through the transflective reflector 24, is slightly reflected by the second color filter 28 and constituents of the light source portion 31 which are arranged on the lower side of the transflective reflector 24. This reflection light goes out as a second reflection light 38, but it becomes extremely weak reflection light because it is originally weak reflection light, and additionally, only a component of the light passes through the transflective reflector 24 when passing through it again, and it is absorbed by the constituents including the first color filter 9.

As described above, when the external light source is used, the first and second incident lights 35 and 37 passes through the first color filter 9 twice and go out to the observer side as the first and second reflection lights 36 and 38 to be recognized as a display.

As the first color filter 9, it is preferable to use a filter having spectral characteristics exhibiting a transmittance of about 40% even at a wavelength outside a maximum transmission wavelength region shown by the curved lines 66, 67 and 68 as has been described using FIG. 17. That is because the reflection display, which is performed only by external light, requires that priority is given to brightness.

In contrast to this, emitted light from the light source portion 31 which is disposed below the second color filter 28, a light component thereof except for transmission wavelengths being absorbed by the second color filter 28, is thus separated in color and becomes a transmission light 40 which passes through the transflective reflector 24, the second polarizer 22, the second substrate 5, the first color filter 9, the liquid crystal layer 15, the first substrate 1 and the first polarizer 21 to go out to the observer side. Accordingly, the light passes through two color filters of the second color filter 28 and the first color filter 9 even when a transmission display is performed, thereby greatly improving chroma as compared with the case in which the light passes through the first color filter 9 only once. Further, leakage of the transmission light decreases, thereby performing a display of good quality even with a bright light source.

As the second color filter 28, it is preferable to use a filter having spectral characteristics of a narrow transmission wavelength region and an extremely low transmittance at a wavelength outside the region as shown by the curved lines 69, 70 and 71 in FIG. 17. That is to give priority to chroma because a certain quantity of light can be secured by light emission of the light source portion 31 in the transmission display. Furthermore, the second color filter 28 is not included in the optical path when the reflection display is performed, so that use of a color filter having a small quantity of transmission light for the second color filter 28 never darkens the refection display.

It is also possible, however, that a color filter having the same spectral characteristics as those of the first color filter 9 is used as the second color filter 28 when the light emission of the light source portion 31 can not be made sufficiently bright due to limitation of the power consumption or when it is desired to suppress the quantity of the light emission of the light source portion 31 to reduce the power consumption.

It should be noted that the first and second color filters 9 and 28 are each formed by performing, for the R, B and G color filters in sequence, a step of applying a filter material having photosensitivity by a spin coating method and then performing photolithography process to form a filter. The second color filter 28 is formed aligned with the first color filter 9 after the transflective reflector 24 is fixed to the second substrate 5. Alternatively, the transflective reflector 24 formed thereon with the second color filter 28 may be bonded to the second substrate 5.

Although the case is explained in this embodiment in which the second color filter 28 is provided on the surface on the opposite side to the visible side of the transflective reflector 24, the transflective reflector 24 and the second color filter 28 may be made separate and another constituent may be sandwiched therebetween. Alternatively, unless the positional relation between the transflective reflector 24 and the second color filter 28 is reversed, one or both of them may be provided on the visible side of the second substrate.

As is clear from the above explanation, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

It should be noted that the color filters having the same spectral characteristics are used as the first color filter 9 and the second color filter 28 also in the below embodiments.

In the liquid crystal display panel of this embodiment, only the second color filter 28 is provided on the opposite side to the first substrate 1 of the transflective reflector 24 in addition to the structure of the conventional liquid crystal display panel which is explained using FIG. 16, and thus the aforesaid effects can be obtained by making little change to the conventional structure. Therefore, it is possible to suppress, to a minimum, change made to the fabrication process of the conventional liquid crystal display panel, thereby realizing improvement in display quality at low cost.

The pixel pitches of the first color filter 9 and the second color filter 28 are made equal, and their filters of the same colors are arranged at positions where they coincide as viewed in a plane view, thereby preventing color mixture when the transmission display is performed. Further, no diffuser is provided below the second color filter 28 so that the light emitted from the light source portion 31 passes through the filters of the same color in the second color filter 28 and the first color filter 9 to thereby prevent color mixture. The scattering property at the light source portion 31 is decreased as described above, but the diffuser is provided on the visible side of the first color filter 9, thereby preventing a decrease in the viewing angle characteristics of the liquid crystal display panel.

<Second Embodiment>

Figure 3:
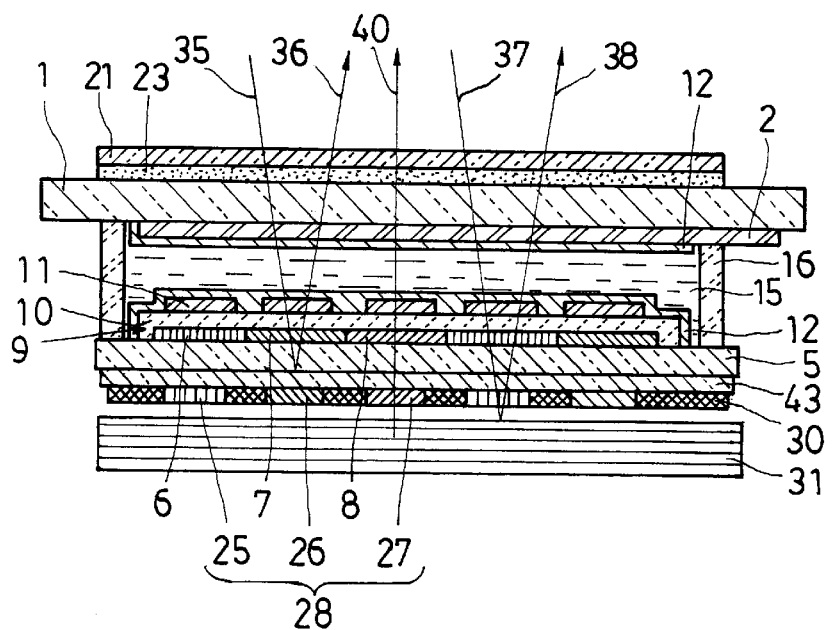
FIG. 3 is a cross-sectional view, corresponding to FIG. 2, of the liquid crystal display panel of a second embodiment of the invention.

Next, a liquid crystal display panel of the second embodiment of the invention is explained using FIG. 3. FIG. 3 is a cross-sectional view, corresponding to FIG. 2, of the liquid crystal display panel. In FIG. 3, the same numerals are given to portions corresponding to those in FIG. 2.

The second embodiment is characterized in that the second color filter is provided with a black matrix having a light shielding effect, a reflection-type polarizer serving as both the transflective reflector and the second polarizer is provided in place of them, plastic films are used for the first and second substrates, and in the method of forming the second color filter. The liquid crystal display panel of this embodiment is the same as the liquid crystal display panel of the first embodiment except for these points, and thus the explanation on portions except for these points is omitted or simplified.

In this embodiment, not glass substrates but transparent plastic film substrates are used as the first substrate 1 and the second substrate 5. Between the first substrate 1 and the second substrate 5, the liquid crystal layer 15 is sandwiched. It should be noted that the material of the first substrate 1 and the second substrate 5 of this embodiment is different from that of the first embodiment, but they are corresponding constituents, and thus the same numerals are used for convenience. This is the same also in the below embodiments.

On the lower side of the second substrate 5, a reflection-type polarizer 43 formed by laminating thin films having different refractive indices in multilayers is provided in place of the second polarizer 22 and the transflective reflector 24. The reflection-type polarizer 43 is a polarizer of which one polarization axis is a transmission axis and an optical axis perpendicular thereto is a reflection axis. Therefore, the reflection-type polarizer 43, which transmits polarized light in a direction of the transmission axis and reflects polarized light in a direction of the reflection axis, functions as a transflective reflector for transmitting a part of light and reflecting almost all the remaining light. When it is desired to adjust the reflectance, two reflection-type polarizers are used stacked one upon another, and an angle formed by their reflection axes is adjusted, thereby setting the reflectance at an appropriate value. In this embodiment, however, only one reflection-type polarizer is used in consideration of thickness and cost.

A black matrix 30, made by mixing carbon (C) powder as an absorbing material in an acrylic resin, is provided as a light shielding layer between the filters of the second color filter 28 and outside the display region. The provision of the black matrix 30 can prevent leakage of light from non-driving portions where voltage can not be applied to the liquid crystal layer, between the electrodes, that is, around the pixel portions, thereby improving contrast ratio when the transmission display is performed.

Further, the second color filter 28 is formed by a printing method in this embodiment. As the printing method, a method of jetting a color filter solution from a plurality of inkjet nozzles to form a color filter in a short period of time is employed, in which the second color filter 28 is formed aligned with the first color filter 9 after the reflection-type polarizer 43 is fixed to the second substrate 5. Besides the above, it is possible to form the first color filter 9 also by the printing method, so that the first color filter 9 and the second color filter 28 may be simultaneously formed on both surfaces of the second substrate 5.

In such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

Further, the provision of the reflective polarizer 43 makes it possible to decrease the thickness as compared with the case in which the second polarizer 22 and the transflective reflector 24 are laminated and to perform reflection and polarization in the same layer, thereby reducing attenuation of light. Further, it becomes possible to prevent parallax between the first color filter 9 and the second color filter 28.

Furthermore, the use of the plastic film substrates for the first substrate 1 and the second substrate 5 allows the inkjet nozzles to intimate contact therewith when the second color filter 28 is formed by the printing method, thereby making it possible to stably form the second color filter 28 in a size good for accuracy. Moreover, the inkjet nozzles can perform a stable scan when scanning the substrate to perform printing, thereby improving positional accuracy.

Furthermore, the black matrix 30 is provided at the second color filter 28, thereby decreasing influence of the transmission light from the surroundings of the pixel portions to thereby improve the contrast ratio. The shielding around the display region 14 can shield (cover) a portion unnecessary for viewing.

<Third Embodiment>

Figure 4:
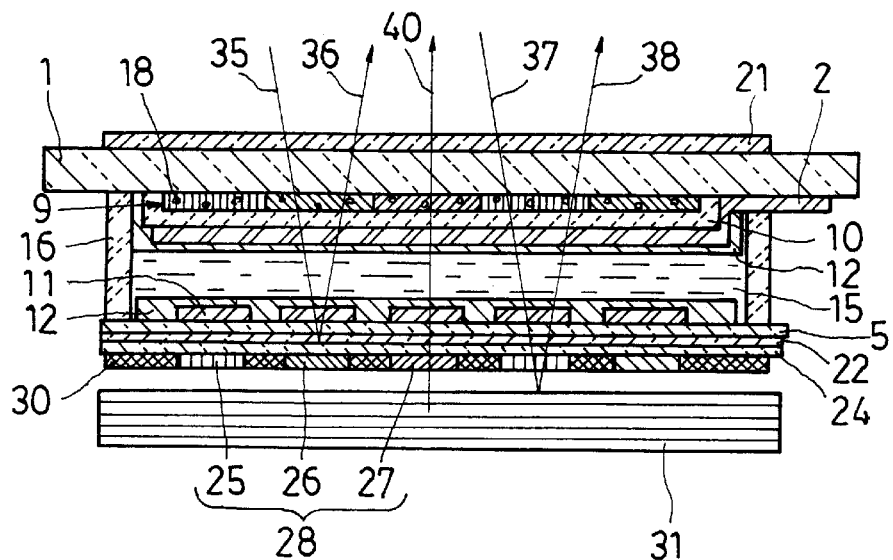
FIG. 4 is a cross-sectional view, corresponding to FIG. 2, of the liquid crystal display panel of a third embodiment of the invention.

Next, a liquid crystal display panel of the third embodiment of the invention is explained using FIG. 4. FIG. 4 is a cross-sectional view, corresponding to FIG. 2, of the liquid crystal display panel. In FIG. 4, the same numerals are given to portions corresponding to those in FIG. 2.

The third embodiment is characterized in that the first color filter 9 is provided on the first substrate 1 and is mixed with a scattering material to have a scattering property, and the strengths of the first substrate and the second substrate are made greatly different so that the strength of the panel is secured with the first substrate. The method of forming the second color filter and the provision of the black matrix are the same as in the liquid crystal display panel of the second embodiment. The liquid crystal display panel of this embodiment is the same as the liquid crystal display panel of the first embodiment except for these points, and thus the explanation on portions except for these points is omitted or simplified.

In this embodiment, a glass substrate with a thickness of 0.7 millimeters (mm) is used as the first substrate 1, and a plastic film substrate with a thickness of 0.2 millimeters (mm) is used as the second substrate 5. Such first substrate 1 and second substrate 5 have the liquid crystal layer 15 sandwiched therebetween, but the strength of the first substrate 1 is ten times or more that of the second substrate 5, and therefore, the second substrate 5 is dependent on the first substrate 1.

In order to improve the positional accuracy of the first color filter 9 and to prevent deterioration of the substrate in the step of forming the color filter, the first color filter 9 is provided on the first substrate 1. The first color filter 9 is made by mixing pigments in a photosensitive acrylic resin and further mixing spacers made of styrene as a scattering material 18. This first color filter 9 is constituted of the R, G and B filters, and has a scattering property owing to a difference in refractive index between the acrylic resin and the scattering material 18.

Further, in order to protect the first color filter 9 from deterioration, the protective insulating film 10 is provided on the first color filter 9. Further, the scanning electrodes 2 in stripes, each made of an indium tin oxide (ITO) film as a transparent conductive film, are provided on the protective insulating film 10. The data electrodes 11 in stripes, each made of an indium tin oxide (ITO) film as a transparent conductive film, are provided on the second substrate 5.

The black matrix 30, made by mixing carbon (C) powder as an absorbing material in an acrylic resin, is provided between the filters of the second color filter 28 and outside the display region 14 as in the second embodiment. The formation of the second color filter 28 by the printing method is also the same as in the second embodiment.

In such liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

Further, the second substrate 5 is made thin, whereby even if the first color filter 9 is provided on the first substrate 1, it is possible to decrease parallax between the first color filter 9 and the second color filter 28. Even if the second substrate 5 is made thin as described above, insufficient strength of the second substrate 5 can be compensated by selecting the material and the thickness of the first substrate 1.

Further, since the scattering material 18 is mixed in the first color filter 9 to have the scattering property, the viewing angle can be made wider and white-superimposition of the display can be prevented with using no diffuser, thus attaining a liquid crystal display panel of good display quality.

<Fourth Embodiment>

Figure 5:
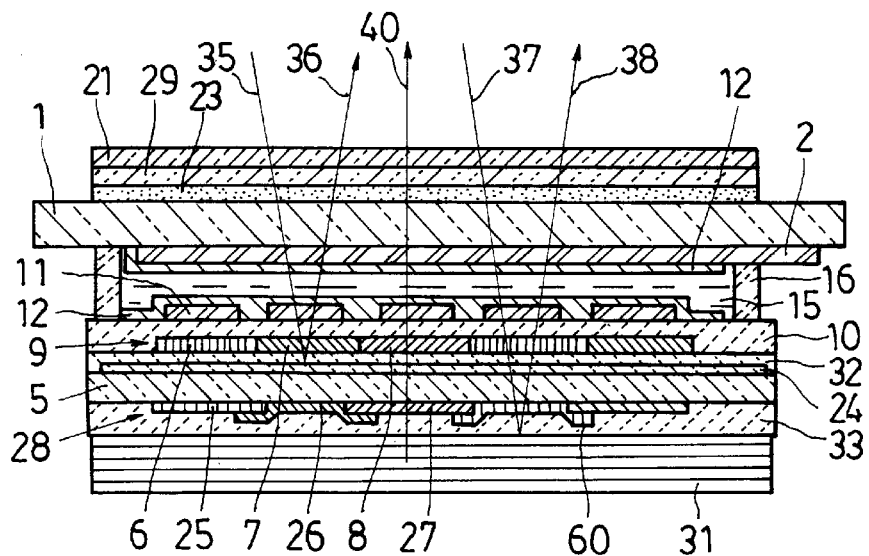
FIG. 5 is a cross-sectional view, corresponding to FIG. 2, of the liquid crystal display panel of a fourth embodiment of the invention.

Next, a liquid crystal display panel of the fourth embodiment of the invention is explained using FIG. 5. FIG. 5 is a cross-sectional view, corresponding to FIG. 2, of the liquid crystal display panel. In FIG. 5, the same numerals are given to portions corresponding to those in FIG. 2.

The fourth embodiment is characterized in that the transflective reflector and the first color filter are provided inside and on the second substrate, overlapping portions are provided in the second color filter, a second color filter insulating film is provided, no second polarizer but a retardation plate is provided, and the light source portion is bonded to the second color filter insulating film. The liquid crystal display panel of this embodiment is substantially the same as the liquid crystal display panel of the first embodiment except for these points, and thus the explanation on portions except for these points is omitted or simplified.

The liquid crystal display panel of this embodiment includes the transflective reflector 24 made of an aluminum (Al) film with a thickness of 30 nanometers (nm) on the surface of the visible side (upper side) of the second substrate 5 which is made of a glass substrate with a thickness of 0.4 mm and opposed to the first substrate 1 with a predetermined gap interposed therebetween, and a transflective reflector insulating film 32 made of an aluminum oxide ($Al_2O_3$) film with a thickness of 30 nanometers (nm) on the transflective reflector 24.

These films are provided by initially providing an aluminum film with a thickness of 60 nm and then anodizing the surface of the aluminum film to form an aluminum oxide film. The aluminum oxide film is made to have a thickness of 30 nm, resulting in the final aluminum film with a thickness of 30 nm, which has characteristics as the transflective reflector 24.

The transflective reflector insulating film 32 is provided thereon with the first color filter 9 constituted of the R, G and B filters 6, 7 and 8. On the first color filter, the protective insulating film 10 is provided.

Further, the transflective reflector insulating film 32 and the protective insulating film 10 are provided over the entire surface of the second substrate 5, and the second substrate 5, the transflective reflector 24, the transflective reflector insulating film 32, the first color filter 9 and the protective insulating film 10 are integrally dealt, so that the sealing material 16 for sealing the liquid crystal layer 15 is provided on the protective insulating film 10.

In the liquid crystal display panel of this embodiment, no second polarizer is provided but a retardation film 29 is provided between the diffuser 23 provided on the first substrate and the first polarizer 21. By using the liquid crystal layer 15 and the retardation film 29, a change in birefringence is used to perform a display.

Since there is no second polarizer provided, the second color filter 28 is provided directly on the surface on the opposite side to the visible side of the second substrate 5.

The first color filter 9, the thickness of which influences the uniformity of the thickness of the liquid crystal layer 15, is required to be flat, but the second color filter 28 is not, and thus the second color filter 28 has a wide tolerable range of the thickness if its color is uniform. Thus, in the second color filter 28, its filters are arranged at positions where they coincide with of the filters of the same colors of the first color filter 9 as viewed in a plane view in regions corresponding to the pixel portions, but overlapping portions 60 made by overlapping the filters of adjacent colors are provided in regions corresponding to gaps around the pixel portions.

As described above, the R, G and B filters 25, 26 and 27 used for the second color filter 28 are filters each having spectral characteristics of a narrow transmission wavelength region and an extremely low transmittance at a wavelength outside the region. Therefore, the filters of different colors are overlapped, thereby extremely decreasing transmittances of the whole wavelengths in the visible light region, allowing them to function equivalently to the black matrix. Thus, the provision of the overlapping portions 60 can prevent leakage of light from the non-driving portions where voltage can not be applied to the liquid crystal layer 15 around the pixel portions when the transmission display is performed to thereby improve the contrast ratio without providing the black matrix.

Further, a second color filter insulating film 33 is provided on the lower side of the second color filter 28 to prevent occurrence of a flaw in fabrication process and deterioration in use. The light source portion 31 constituted of an electroluminescent element is provided on the further lower side as an auxiliary light source. The light source portion 31 and the second color filter insulating film 33 are bonded together to prevent interface reflection between the light source portion 31 and an air layer that is formed between them or to prevent interface reflection between the second color filter insulating film 33 and the air layer due to difference in refractive index so as to improve efficiency of using light when the transmission display is performed.

In such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

Further, when the reflection display is performed, there is only one reflection-type polarizer on the optical path, causing less absorption as compared with the case of two polarizers, resulting in a bright display. Further, the provision of the transflective reflector 24 on the visible side of the second substrate 5 makes it possible to reduce parallax, thereby improving brightness.

Furthermore, an aluminum film is used as the transflective reflector 24 and the transflective reflector insulating film 32 made of an aluminum oxide film is provided on the transflective reflector 24 by anodization, thereby preventing deterioration of the aluminum film in the step of forming the first color filter 9.

<Fifth Embodiment>

Figure 6:
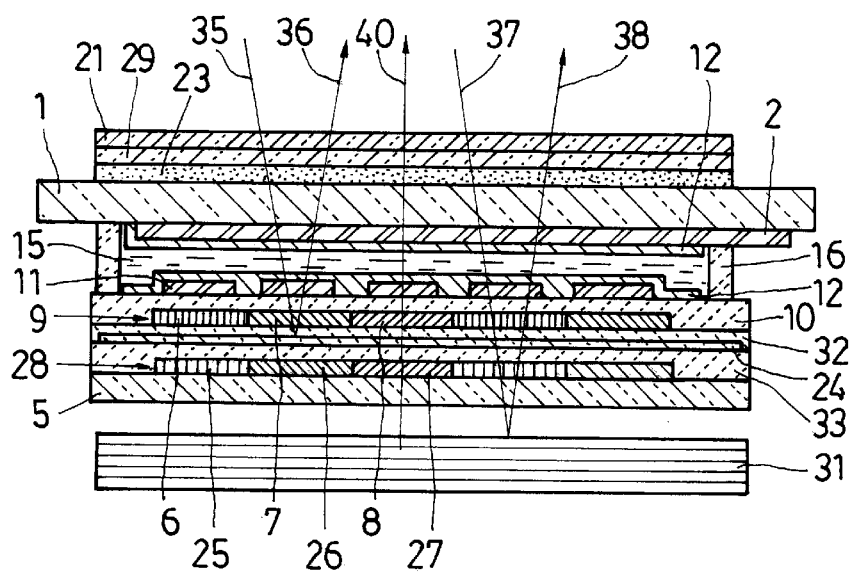
FIG. 6 is a cross-sectional view, corresponding to FIG. 2, of the liquid crystal display panel of a fifth embodiment of the invention.

Next, a liquid crystal display panel of the fifth embodiment of the invention is explained using FIG. 6. FIG. 6 is a cross-sectional view, corresponding to FIG. 2, of the liquid crystal display panel. In FIG. 6, the same numerals are given to portions corresponding to those in FIG. 2.

The liquid crystal display panel of the fifth embodiment is different from the liquid crystal display panel of the fourth embodiment only in that the second color filter and the second color filter insulating film are provided on the visible side of the second substrate, and no overlapping portion is provided. This liquid crystal display panel is substantially the same as the liquid crystal display panel of the fourth embodiment, and thus the explanation on portions except for these points is omitted or simplified.

The liquid crystal display panel of this embodiment includes the second color filter 28 constituted of the R, G and B filters 25, 26 and 27 is provided on the surface of the visible side of the second substrate 5 which is made of a glass substrate with a thickness of 0.4 millimeters (mm) and opposed to the first substrate 1 with a predetermined gap interposed therebetween. Adjacent filters 25, 26 and 27 slightly overlap one upon another or abut on each other, in which no overlapping portion is provided. Further, the second color filter 28 is provided thereon with the second color filter insulating film 33 to secure absolute contact with the aluminum film constituting the transflective reflector 24.

On the second color filter insulating film 33, the transflective reflector 24 made of an aluminum film with a thickness of 30 nm and the transflective reflector insulating film 32 made of an aluminum oxide film with a thickness of 30 nm are provided as in the fourth embodiment.

It is also the same as in the fourth embodiment that the first color filter 9 constituted of the R, G and B filters 6, 7 and 8 is provided on the transflective reflector insulating film 32, and the protective insulating film 10 is provided on the first color filter.

In this embodiment, the second color filter insulating film 33, the transflective reflector insulating film 32 and the protective insulating film 10 are provided over the entire surface of the second substrate 5, and the second substrate 5, the second color filter 28, the second color filter insulating film 33, the transflective reflector 24, the transflective reflector insulating film 32, the first color filter 9 and the protective insulating film 10 are integrally dealt, so that the sealing material 16 for sealing the liquid crystal layer 15 is provided on the protective insulating film 10.

In such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

Further, it is possible to make the gap between the first color filter 9 and the second color filter 28 extremely small, enabling a display without parallax and making the total thickness of the liquid crystal display panel extremely small.

<Sixth Embodiment>

Figure 7:
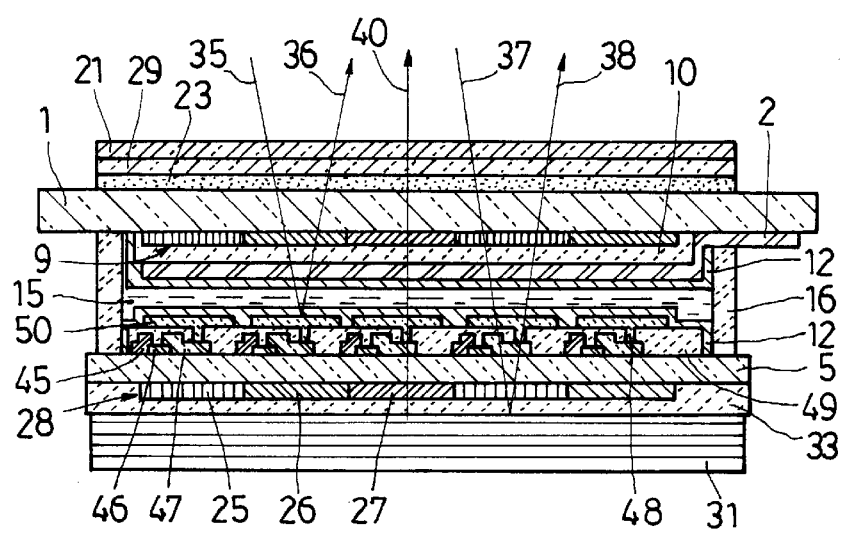
FIG. 7 is a cross-sectional view, corresponding to FIG. 2, of the liquid crystal display panel of a sixth embodiment of the invention.

Next, a liquid crystal display panel of the sixth embodiment of the invention is explained using FIG. 7. FIG. 7 is a cross-sectional view, corresponding to FIG. 2, of the liquid crystal display panel. In FIG. 7, the same numerals are given to portions corresponding to those in FIG. 2.

The liquid crystal display panel of the sixth embodiment is characterized in that non-linear resistance elements are provided on the second substrate, the non-linear resistance element and the transflective reflector are electrically connected, and the first color filter is provided on the first substrate.

In the liquid crystal display panel of this embodiment, the first color filter 9 constituted of the R, G and B filters is provided on the first substrate 1 (liquid crystal layer side) which is made of a glass substrate. Further, the the protective insulating film 10 is provided on the first color filter 9, and the scanning electrode 2 made of an indium tin oxide (ITO) film that is a transparent conductive film and in one body completely covering the entire display region is provided on the protective insulation film 10. This scanning electrode 2 may be formed in stripes.

The second substrate 5, which is made of a glass substrate with a thickness of 0.4 mm and opposed to the first substrate 1 with a predetermined gap interposed therebetween, is provided thereon with gate electrodes 46, gate insulating films provided on the gate electrodes 46, semiconductor layers each made of an amorphous silicon (a-Si) film, semiconductor layers for contact containing impurity ions, source electrodes (data electrodes) 45 and drain electrodes 47. However, the illustration of these constituents is omitted except for the source electrodes 45, the gate electrodes 46 and the drain electrodes 47. As described above, thin film transistors (TFTs) which are three-terminal active elements are provided as the non-linear resistance elements in this embodiment.

Further, a layer insulating film 49 having contact holes 48 on the drain electrodes 47 is provided on the second substrate 5. Transflective reflectors 50 are provided on the layer insulating film 49 to connect with the drain electrodes 47 through the contact holes 48. This transflective reflector 50 is made of a thin film of aluminum and also serves as a pixel electrode in this liquid crystal display panel.

The alignment films 12 as treatment films for aligning the liquid crystal layer 15 in predetermined directions are provided on the first substrate 1 and the second substrate 5. The first substrate 1 and the second substrate 5 are coupled together with a fixed gap interposed therebetween with the sealing material 16 in such a manner that the scanning electrodes 2 on the first substrate 1 and the transflective reflectors (pixel electrodes) 50 on the second substrate 5 are opposed, and the liquid crystal is injected though the opening in the sealing material and sealed with the closing material, thereby forming the liquid crystal layer 15.

Further, the diffuser 23, the retardation film 29 and the first polarizer 21 are provided on the visible side of the first substrate 1 as in the fourth embodiment. Also in this embodiment, not a second polarizer but the retardation film 29 is used, whereby a change in birefringence of the liquid crystal layer 15 is used to perform a display.

Further, on the lower side of the second substrate 5, the second color filter 28 is provided in which the pixel pitch is the same as that of the first color filter 9 and the color filters are arranged at positions where they coincide with filters of the same colors of the first color filter 9 as viewed in a plane view. In this second color filter 28, not provided with overlapping portions, the R, G and B filters 25, 26 and 27 are in close contact with each other.

Further, a second color filter insulating film 33 is provided on the lower side of the second color filter 28 to prevent occurrence of a flaw in fabrication process and deterioration in use. The light source portion 31 constituted of an electroluminescent element is provided on the further lower side as an auxiliary light source. The light source portion 31 is bonded to the second color filter insulating film 33 to prevent interface reflection between the light source portion 31 and the second color filter insulating film 33 so as to improve efficiency of using light when the transmission display is performed.

Also in such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

The thin film transistors (TFTs) are used as three-terminal resistance elements to drive the liquid crystal display panel, thereby increasing modulation of the liquid crystal layer 15, resulting in improved display quality.

Furthermore, the drain electrodes 47 forming the non-linear resistance elements and the transflective reflectors 50 are connected, and the transflective reflectors 50 are used as the pixel electrodes, thereby making decrease in voltage extremely small. Moreover, the transflective reflectors 50 can be provided on the side facing the liquid crystal layer 15, improving the attenuation problem.

It should be noted that the case is explained in which the second color filter 28 is provided on the opposite side (lower side) to the visible side of the second substrate 5 in this embodiment. However, a structure, in which the second color filter 28 is provided on the visible side (upper side) of the second substrate 5, the second color filter insulating film 33 is provided on the second color filter 28 and the non-linear resistance elements are provided on the upper side of the second color filter insulating film 33, is very effective as a structure of the first color filter 9 and the second color filter 28 being adjacent.

Although the three-terminal thin film transistors (TFTs) are used as the non-linear resistance elements in this embodiment, it is also effective to use two-terminal non-linear resistance elements each constituted of a diode using MIM (metal-insulator-metal), MSI (metal-semi-insulator-metal), or amorphous silicon in order to decrease temperature and to simplify the process.

<Seventh Embodiment>

Figure 8:
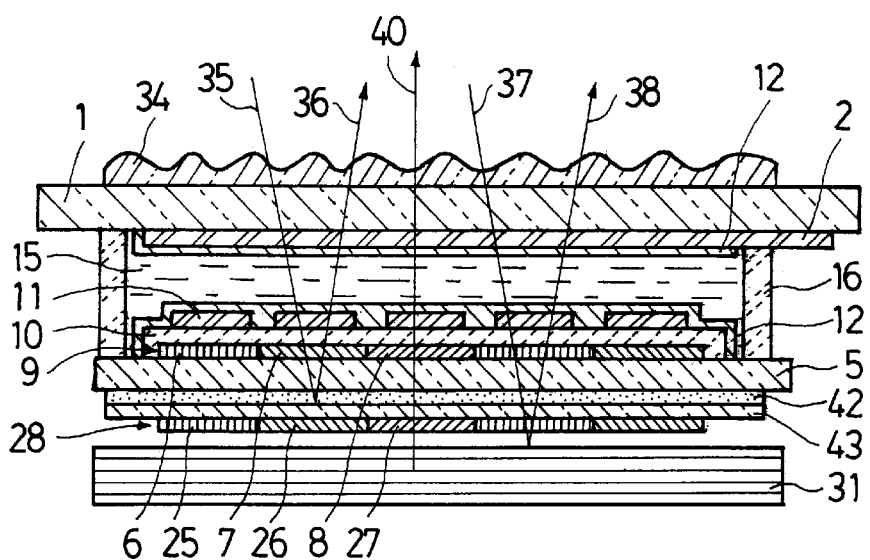
FIG. 8 is a cross-sectional view, corresponding to FIG. 2, of the liquid crystal display panel of a seventh embodiment of the invention.

Next, a liquid crystal display panel of the seventh embodiment of the invention is explained using FIG. 8. FIG. 8 is a cross-sectional view, corresponding to FIG. 2, of the liquid crystal display panel. In FIG. 8, the same numerals are given to portions corresponding to those in FIG. 2.

The seventh embodiment is characterized in that the first polarizer has irregularities, and the reflection-type polarizer is used for serving as both the transflective reflector and the second polarizer. The liquid crystal display panel of this embodiment is substantially the same as the liquid crystal display panel of the first embodiment except for these points, and thus the explanation on portions except for different points is omitted or simplified.

In the liquid crystal display panel of this embodiment, a first polarizer 34 provided on the upper side of the first substrate 1 is formed in irregular shape to have a scattering property and is further subjected to non-reflection treatment.

On the lower side of the second substrate 5, the reflection-type polarizer 43 formed by laminating thin films having different refractive indices in multilayers. The reflection-type polarizer 43 is a polarizer of which one polarization axis is a transmission axis and an optical axis perpendicular thereto is a reflection axis. Therefore, the reflection-type polarizer 43, which transmits polarized light in a direction of the transmission axis and reflects polarized light in a direction of the reflection axis, functions as a transflective reflector for transmitting a part of light and reflecting almost all the remaining light. The second substrate 5 and the reflection-type polarizer 43 are bonded together with an adhesive 42 having a scattering property.

Below the second color filter 28, the light source portion 31 is provided as an auxiliary light source also in this embodiment. The light source portion 31 is constituted of a cold-cathode tube, a reflector and a lens sheet to limit a diffusing property, in which the lens sheet limits the diffusing property.

Incidentally, if it is desired to obtain a sufficient scattering property only by the irregular shape of the surface of the first polarizer 34, blur or roughness of characters caused by the scattering property increases. Alternatively, if it is desired to obtain a sufficient scattering property only by the adhesive 42, the scattering property between the first color filter 9 and the second color filter 28 becomes excess, whereby light deviates between the color filters, causing color mixture, resulting in a decrease in chroma. Hence, in this embodiment, the provision of both the irregular shape of the surface of the first polarizer 34 and the adhesive 42 having the scattering property, thereby making it possible to improve viewing angle characteristics without blur or color mixture which occurs when only one of them is provided.

Also in such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

Further, the provision of the reflection-type polarizer 43 makes it possible to decrease the thickness as compared with the case in which the second polarizer 22 and the transflective reflector 24 are laminated and to perform reflection and polarization in the same layer, thereby reducing attenuation of light. Further, it becomes possible to prevent parallax between the first color filter 9 and the second color filter 28.

<Eighth Embodiment>

Figure 9:
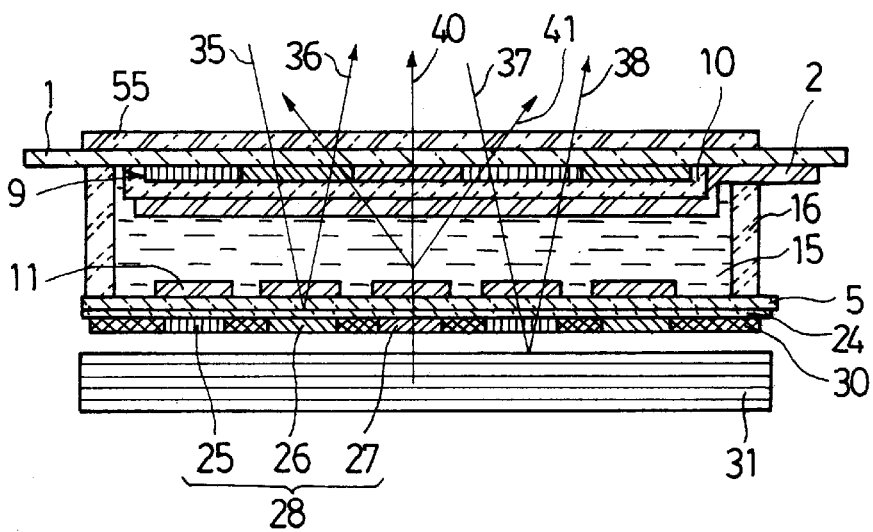
FIG. 9 is a cross-sectional view, corresponding to FIG. 2, of the liquid crystal display panel of an eighth embodiment of the invention.

Next, a liquid crystal display panel of the eighth embodiment of the invention is explained using FIG. 9. FIG. 9 is a cross-sectional view, corresponding to FIG. 2, of the liquid crystal display panel. In FIG. 9, the same numerals are given to portions corresponding to those in FIG. 2. The liquid crystal display panel is characterized in that no polarizer is provided and a display is performed by a scattering liquid crystal layer.

In the liquid crystal display panel of this embodiment, the first color filter 9 constituted of the R, G and B filters is provided on the first substrate 1 which is made of a transparent plastic film. The first color filter 9 has a structure in which adjacent filters have a slight gap therebetween. On the first color filter 9, the protective insulating film 10 made of an acrylic resin is provided to flatten levels of the color filters and to prevent deterioration occurring in fabrication process.

The scanning electrodes 2 in stripes each made of an indium tin oxide (ITO) film as a transparent conductive film are provided on the protective insulating film 10. The data electrodes 11 in stripes each made of an indium tin oxide (ITO) film as a transparent conductive film are provided on the second substrate 5 which is made of a transparent plastic film and opposed to the first substrate 1 with a predetermined gap interposed therebetween. The scanning electrode 2 and the data electrodes 11 form a pixel portion where they coincide as viewed in a plane view, and a plurality of the pixel portions form a display region.

The first substrate 1 and the second substrate 5 are coupled together with a fixed gap interposed therebetween with the sealing material 16 in such a manner that the scanning electrodes 2 on the first substrate 1 and the data electrodes 11 on the second substrate 5 are opposed, and the liquid crystal is injected though the opening provided in the sealing material 16 and sealed with the closing material 17. For the liquid crystal layer 15 of this embodiment, a scattering mixed liquid crystal is used, which electrically controls a scattering state and a transmission state by a difference in refractive index between the liquid crystal and a transparent solid substance. The use of this mixed liquid crystal enables a display without using a polarizer, resulting in a bright display.

Further, on the upper side of the first substrate 1, an ultraviolet cut film 55 is provided which has a transmittance of three percents or less of light (ultraviolet light) with a wavelength shorter than 380 nm. The ultraviolet cut film 55 can prevent application of ultraviolet light contained in light from an external light source to the liquid crystal layer 15. Further, since the plastic film in which its transmittance decreases when ultraviolet light is applied thereto is used as the first substrate 1 in this embodiment, the provision of the ultraviolet cut film 55 is effective also in a viewpoint of prevention of the decrese of the transmittance of the first substrate 1.

Furthermore, the transflective reflector 24 is provided on the lower side of the second substrate 5, and the second color filter 28, in which its filters are arranged at positions where they coincide with filters of the same colors of the first color filter 9 as viewed in a plane view, is provided on the lower side of the transflective reflector 24. Moreover, the black matrix 30 made by mixing carbon (C) powder as an absorbing material in an acrylic resin is provided between the filters of the second color filter 28.

Further, the light source portion 31 is provided below the second color filter 28 as an auxiliary light source. An electro-luminescent (EL) element that is thin, elastic and resistant to an impact is used as the light source portion 31.

The liquid crystal display panel of this embodiment is a liquid crystal display panel having high elasticity to an impact from the outside because it is made by combining the first and second substrates 1 and 5 each made of a plastic film with the liquid crystal layer 15 made of a mixed liquid crystal layer and joining the first and second substrates 1 and 5 with the transparent solid substance, thereby making the gap therebetween hardly change against the impact from the outside, and making change in the gap hardly cause change in display quality.

As has been described, the liquid crystal display panel of this embodiment controls the scattering state and the transmission state of the liquid crystal layer to thereby perform a display through use of a difference in reflectance of the two states. Also in such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

When the transmission display is performed by the light of the light source portion 31, the light passes through the filters of the same color of the first color filter 9 and the second color filter 28 at the pixel in the transmission state, resulting in a bright display with high color purity. Conversely, at the pixel in the scattering state, light passes through the second color filter 28 is changed in direction by the liquid crystal layer 15 and is made incident on a filter of a difference color of the first color filter 9 as an out-going light 41, resulting in decreased quantity of transmission light. Therefore, the provision of the second color filter 28 can improve contrast ratio as compared with the case of only the first color filter 9 being used. Accordingly, it is very effective to apply the invention to the liquid crystal display panel using the scattering liquid crystal for controlling the scattering state and the transmission state.

Although the case in which the ultraviolet cut film 55 is separately provided on the upper side of the first substrate 1 is explained in this embodiment, the first substrate 1 may be mixed with an ultraviolet cutting material, for example, titanium oxide ($TiO_2$) so that the first substrate 1 itself has ultraviolet cutting effect.

<Ninth Embodiment>

Figure 10:
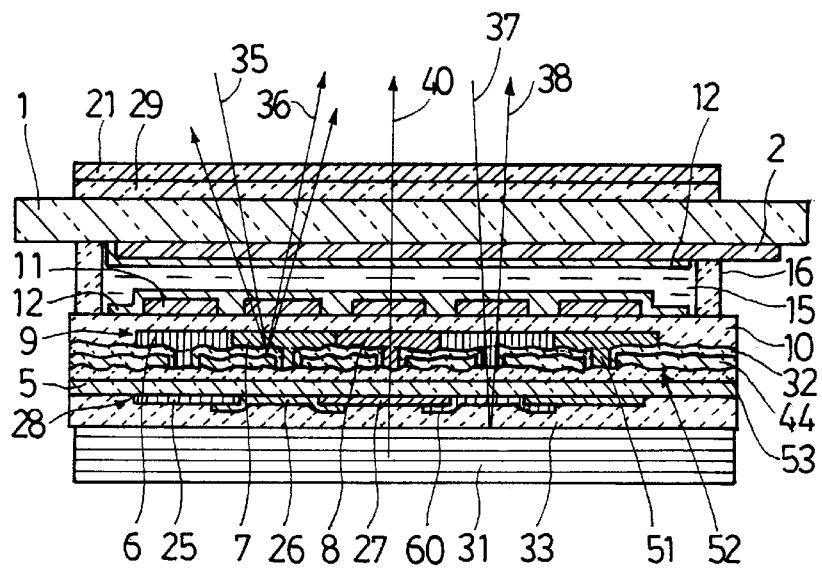
FIG. 10 is a cross-sectional view, corresponding to FIG. 2, of the liquid crystal display panel of a ninth embodiment of the invention.

Next, a liquid crystal display panel of the ninth embodiment of the invention is explained using FIG. 10. FIG. 10 is a cross-sectional view, corresponding to FIG. 2, of the liquid crystal display panel. In FIG. 10, the same numerals are given to portions corresponding to those in FIG. 2.

The ninth embodiment is characterized in that transmitting hole portions and reflecting portions are provided in the transflective reflector, and the transflective reflector has irregularities. The liquid crystal display panel of this embodiment is substantially the same as the liquid crystal display panel of the fourth embodiment except for these points, and thus the explanation on portions except for these points is omitted or simplified.

The liquid crystal display panel of this embodiment includes an irregular insulating film 53 for making the transflective reflector in irregular shape provided on the surface of the visible side (upper side) of the second substrate 5 which is made of a glass substrate with a thickness of 0.4 mm and opposed to the first substrate 1 with a predetermined gap interposed therebetween, a transflective reflector 44 made of an aluminum (Al) film in irregular shape with a thickness of 100 nm provided on the irregular insulating film 53, and further the transflective reflector insulating film 32 made of an aluminum oxide ($Al_2O_3$) film with a thickness of 30 nanometers (nm) provided on the transflective reflector 44. Further, the transflective reflector 44 includes transmitting hole portions 51 with high transmittances and the reflecting portions 52 with high reflectances.

In the transflective reflector 44 of this embodiment, different from that of the above-described embodiments, the transmittance of incident light is determined by the area ratio between the transmitting hole portion 51 and the reflecting portion 52. In order to uniform the transmittances at pixels, the transmitting hole portion 51 is adapted to occupy a fixed ratio of area in each pixel portion 13. Further, although the case is shown in which the transmitting hole portion 51 is formed near an end of the pixel portion 13 in FIG. 10 for convenience of illustration, it is preferably formed near the center of the pixel portion 13.

The method of forming these films is as follows. The irregular insulating film 53 having irregularities on its upper surface is initially formed, and then an aluminum film with a thickness of 130 nm for forming the transflective reflector 44 and the transflective reflector insulating film 32 is formed on the irregular insulating film 53. In this event, the aluminum film becomes irregular shape along the irregularities of the surface of the irregular insulating film 53. After the aluminum film at the portions for forming the transmitting hole portions 51 is removed by etching processing, the aluminum film is subjected to anodization, thereby forming the transflective reflector insulating film 32 with a thickness of 30 nm at the surface of the aluminum film. Then, the remaining portions that are not oxidized by the anodization become the reflecting portions 52, having a film thickness of 100 nm, of the transflective reflector 44. The film thickness hardly allows light to pass through. The upper surface of the transflective reflector 44 and the upper surface of the transflective reflector insulating film 32 become irregular shape derived from the irregularities of the upper surface of the irregular insulating film 53, and the transflective reflector insulating film 32 is formed on the inner surface of the transmitting hole portions 51.

It should be noted that no diffuser is provided on the visible side of the first substrate in this embodiment because a sufficient scattering property can be obtained by the irregularities provided on the transflective reflector 44.

Also in such a liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

Further, the transmitting hole portions 51 and the reflecting portions 52 are provided in the transflective reflector 44 to determine the transmittance by their area ratio, requiring the step of performing etching, but facilitating the control of the transmittance, and it is possible to control the transmittance without changing wavelength dependencies of the transmittance and reflectance as in the case of control by film thickness, resulting in further improved display quality.

The sufficient scattering property is obtained only by the irregularities provided on the transflective reflector 44 in this embodiment. When the first color filter 9 is located close to the second color filter 28, however, the scattered light reaches the first color filter 9 with little displacing in the horizontal direction, scarcely producing color-mixture problem even in such a structure. The color-mixture presents a problem when the transmission display is performed. However, the structure in which light passes only through the transmitting hole portion 51 as in this embodiment scarcely produces color mixture due to the scattering because the area of the transmitting hole portion 51 is smaller than that of the filter of one pixel (one color), and the provision of the transmitting hole portion 51 near the center of the pixel portion 13 allows light to pass through the filter corresponding to the same pixel even if the transmitted light is scattered to slightly displace in transmission position. On the other hand, a scattering angle caused by the irregularities of the transflective reflector 44 can be easily controlled by virtue of the shape of the irregular insulating film 53 as compared with the case of the diffuser in which a scattering material is dispersed in a resin or the like, and thus it is effective to use such a transflective reflector in viewpoint of ease of design.

<Tenth Embodiment>

Figure 11:
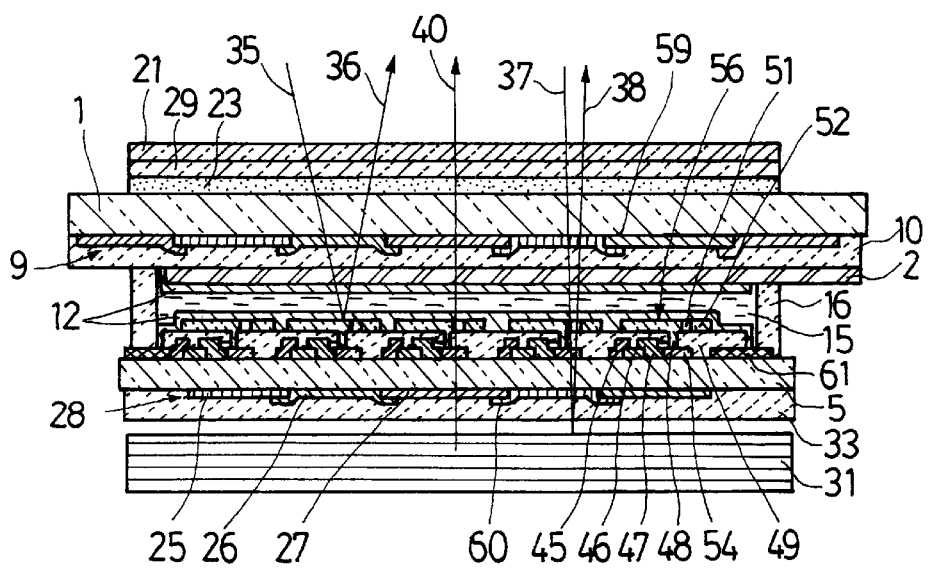
FIG. 11 is a cross-sectional view, corresponding to FIG. 2, of the liquid crystal display panel of a tenth embodiment of the invention.

Next, a liquid crystal display panel of the tenth embodiment of the invention is explained using FIG. 11. FIG. 11 is a cross-sectional view, corresponding to FIG. 2, of the liquid crystal display panel. In FIG. 11, the same numerals are given to portions corresponding to those in FIG. 2.

The tenth embodiment is characterized in that the transmitting hole portions and the reflecting portions are provided in the transflective reflectors, auxiliary electrodes are provided, light-shielding portions are provided, overlapping potions are provided in the first and second color filters, and the first color filter is provided also on the outside of the display region. The liquid crystal display panel of this embodiment is substantially the same as the liquid crystal display panel of the sixth embodiment except for these points, and thus the explanation on portions except for these points is omitted or simplified.

In the liquid crystal display panel of this embodiment, the transmitting hole portions 51 with high transmittance and the reflecting portions 52 with high reflectance are provided in transflective reflectors 56 also serving as pixel electrodes. The transflective reflector 56 is formed of a silver alloy film and has a thickness of 120 nm at the reflecting portion 52. This portion hardly transmits light. In the transflective reflector 56, different from the transflective reflector 50 used in the sixth embodiment, the transmittance of incident light is determined by the area ratio between the transmitting hole portion 51 and the reflecting portion 52. The fact that the use of such a transflective reflector facilitates adjustment of the transmittance is as explained in the ninth embodiment.

In the meantime, since the liquid crystal display panel of this embodiment includes TFTs as in the sixth embodiment, and the transflective reflectors 56 also serve as the pixel electrodes, voltage can not be applied to the liquid crystal layer 15 where the transmitting hole portions 51 are provided. Hence, transparent auxiliary electrodes 54 connecting with the drain electrodes 47 are provided on the second substrate 5 to apply voltage to the liquid crystal layer also at the transmitting hole portions 51. The auxiliary electrode 54 is preferably provided in a region smaller than that of the pixel portion and within a region including at least the transmitting hole portion 51. Incidentally, FIG. 11 shows the structure in which the transflective reflector 56 connects with the auxiliary electrode 54, but the transflective reflector 56 may be connected with the drain electrode 47. Alternatively, the drain electrode 47 may be formed of a transparent electrode material and extend to such a region instead of providing the auxiliary electrode 54.

Further, in this embodiment, the first color filter 9 is provided on the entire surface on the opposite side (lower side) to the visible side of the first substrate including the display region and its outside region, and the protective insulating film 10 made of an acrylic resin is further formed on the entire surface of the lower side of the first color filter 9 to flatten levels of its color filters and to prevent deterioration.

Furthermore, the first and second color filters 9 and 28 have substantially the same pixel pitch and include the filters of the same colors arranged at positions where they coincide as viewed in a plane view, and are provided with overlapping portions 59 and 60 made by overlapping the filters of adjacent colors respectively at regions corresponding to gaps around the pixel portions 13.

The overlapping portions 60 provided in the second color filter 28 perform an equal function to that of the black matrix as explained in the fourth embodiment. The first color filter 9, having a certain transmittance even outside the transmission wavelength region, and having a low transmittance to some extent within the whole wavelength region of the visible light at the overlapping portion 59 where the filters of different colors are overlapped, can prevent leakage of light from the non-driving portions where voltage can not be applied to the liquid crystal layer around the pixel portions, thereby improving contrast ratio. In this embodiment, the protective insulating film 10 is provided on the entire surface of the first substrate 1 to flatten levels in the first color filter 9, whereby the provision of the overlapping portions 59 in the first color filter 9 scarcely affects the thickness of the liquid crystal layer 15.

Moreover, in this embodiment, a light shielding portion 61 is formed of chrome-molybdenum alloy that is an electrode material constituting the gate electrode 46 on the outer peripheral portion of the display region. The provision of the light shielding portion 61 can prevent light of the light source portion 31 from leaking from the outer peripheral portion of the display region when the transmission display is performed, thereby improving the contrast of the display. Further, the light shielding portion 61 can be formed in the same step of forming the gate electrodes 46, thereby obtaining this effect without increasing the number of steps. However, only by the provision of the light shielding portion 61, the reflection from the light shielding portion 61 is too strong when the reflection display is performed, causing fogging over the display, resulting in a decrease in contrast. Hence, the first color filter 9 is provided also at the outside of the display region as described above to thereby prevent direct reflection from the light shielding portion 61.

Also in the liquid crystal display panel, the first color filter 9 and the second color filter 28 are provided, whereby the reflection display can be performed using the first color filter 9, in which priority is given to brightness, and the transmission display can be performed using two layers of color filters of the second color filter 28, in which priority is given to chroma, and the first color filter 9, so that the transmission display with high brightness and high chroma can be performed with little decrease in brightness of the reflection display.

The contrast of the display can be improved by the overlapping portions 59 and 60 provided in the first and second color filters 9 and 28 and the light shielding portion 61.

<Modification of Embodiments>

Figure 12:
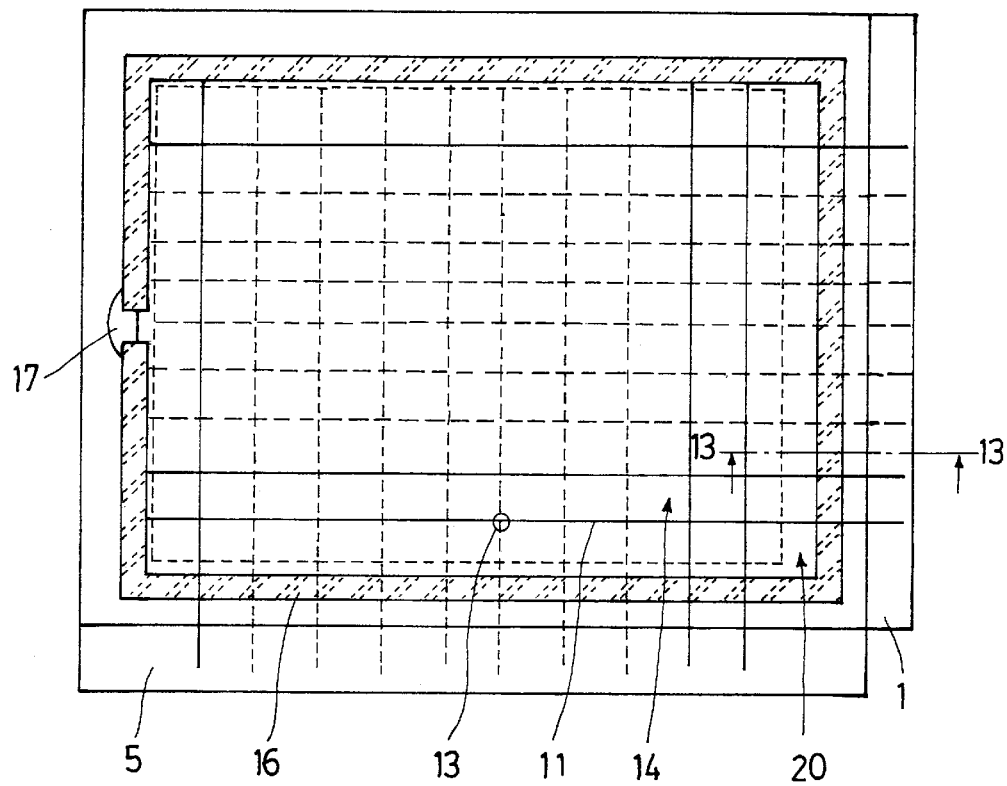
FIG. 12 is a schematic plane view showing a modification of the liquid crystal display panel of the invention.
Figure 13:
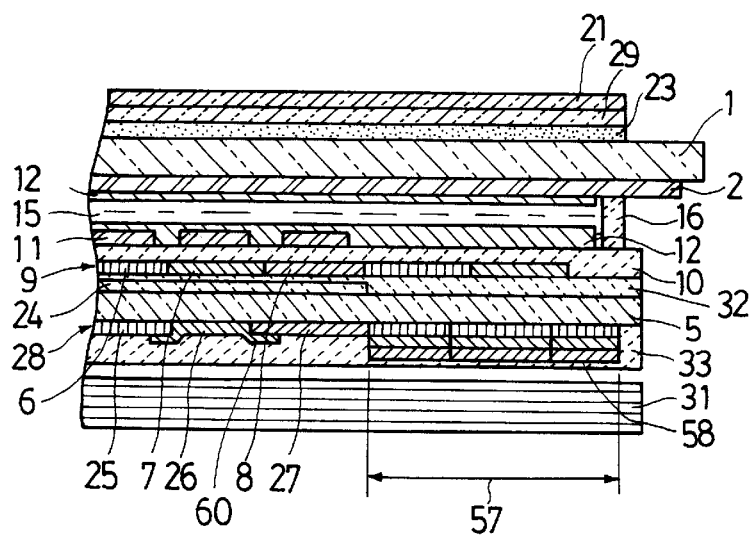
FIG. 13 is a schematic partial cross-sectional view taken along a line 13—13 in FIG. 12.

Next, a modification of the liquid crystal display panels of the embodiments which have been explained hereinbefore is explained using FIG. 12 and FIG. 13. FIG. 12 is a schematic plane view of the liquid crystal display panel. FIG. 13 is a partial cross-sectional view taken along a line 13—13 in FIG. 12. In these drawings, the same numerals are given to portions corresponding to those in FIG. 1 and FIG. 2. Incidentally, the line 13—13 is not on the scanning electrode 2 in FIG. 12, but it is assumed that the scanning electrode 2 is included in the cross section taken along the line 13—13 because much more scanning electrodes are densely formed on an actual liquid crystal display panel.

The modification explained here is characterized in that a transflective reflector removed portion and a color filter laminated portion are provided outside the display region. The case in which this modification is applied to the liquid crystal display panel of the sixth embodiment is explained here, in which only the points different from the sixth embodiment are explained.

In this modification, a cover portion 20 at the outside of the display region 14 shown in FIG. 12 is, as shown in FIG. 13, provided with no transflective reflector 24 and made a transflective reflector removed portion 57. This is because if the cover portion 20 is provided with the transflective reflector 24, the cover portion 20 is usually in a white display in a normally white mode for displaying white when no voltage is applied, to be bright as compared with the display region, resulting in a decrease in visibility of the display region.

However, only by providing no transflective reflector 24 in the cover portion 20, light leaks from the transflective reflector removed portion 57 when the transmission display is performed, decreasing the visibility of the display. Therefore, a color filter laminated portion 58 is formed at a portion of the second color filter 28 corresponding to the transflective reflector removed portion 57 by laminating filters of two colors or more (different in transmission wavelength) out of the R, G and B filters 25, 26 and 27. The filters of all of the three colors are laminated in the case shown in FIG. 13.

The color filters constituting the second color filter 28 hardly transmit light with a wavelength outside the transmission wavelength region as explained in the first embodiment. Therefore, the filters of different colors, when they are laminated, do not transmit almost all light over the whole wavelength region of the visible light to function as a panel cover. Consequently, the provision of the color filter laminated portion 58 avoids leakage of light from the transflective reflector removed portion 57 when the transmission display is performed, resulting in improved visibility of the display.

It should be noted that a light shielding member having a low reflectance and a light shielding property may be provided instead of providing the color filter laminated portion 58. This light shielding member may be provided on the first substrate 1. Alternatively, the first color filter 9 and the second color filter 28 may be provided with filters of different colors at portions corresponding to the transflective reflector removed portion 57.

Alternatively, a plurality of colors of the first color filters 9 may be laminated at the portion corresponding to the transflective reflector removed portion 57, but the lamination, if required, is preferably performed at the second color filter 28, because the lamination of the first color filters 9 affects the thickness of the liquid crystal layer 15.

Figure 14:
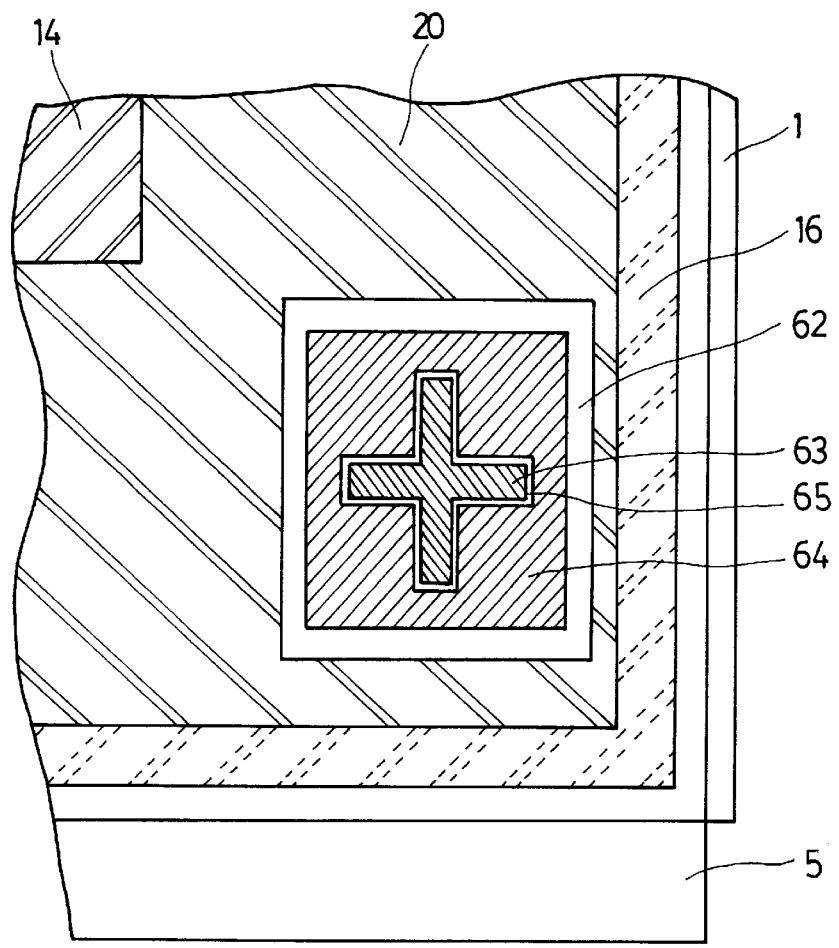
FIG. 14 is a plane view showing an example in which the liquid crystal display panel of the invention is provided with an aligning mark with a part of the panel enlarged.
Figure 15:
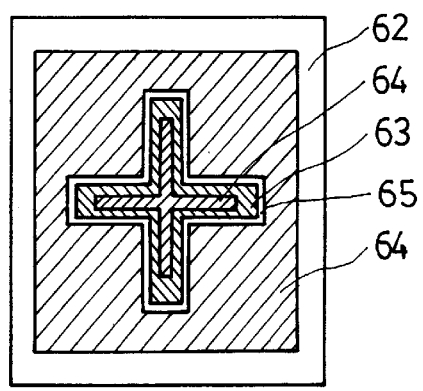
FIG. 15 is a plane view showing another example of the aligning mark.

In the meantime, in order to align the first color filter 9 and the second color filter 28, it is preferable to provide a mark forming portion in a square 200 μm to 500 μm in the transflective reflector removed portion 57 or at a position corresponding to the cover portion 20 of the transflective reflector 24 when the transflective reflector removed portion 57 is not provided, and to provide an aligning mark inside the mark forming portion. Next, the aligning mark is explained using FIG. 14 and FIG. 15. FIG. 14 is a plane view showing the case in which the aligning mark is provided on the liquid crystal display panel with a part of the panel enlarged, and FIG. 15 is a plane view showing another example of the aligning mark.

The aligning mark is, as shown in FIG. 14, provided outside the display region 14. In the case shown in FIG. 14, a mark forming portion 62, where normal first color filter 9 and second color filter 28 are not provided, is provided at a part of the transflective reflector removed portion 57, and aligning marks 63 and 64 are provided inside the mark forming portions 62.

The mark forming part 62 is a square 350 μm on a side, and the first aligning mark 63 is formed, as a part of the first color filter 9, to be a cruciform mark in which lines with a width of 50 μm intersect. The second aligning mark 64 is formed, as a part of the second color filter 28, to be a mark of the shape of a square 300 μm on a side having a hollow part in which the shape of the first aligning mark 63 stays with an aligning gap 65 with a width of 10 μm interposed.

The first and second color filters 9 and 28 are designed to be in a desired positional relation when the first and second aligning marks 63 and 64 are in the positional relation shown in FIG. 14, thereby making it possible to easily align the first and second color filters 9 and 28 when actually assembled (or formed) using the first and second aligning marks 63 and 64 as guides.

The formation of the aligning marks with the color filters as described above enables alignment with lighting from either side of the liquid crystal display panel. Further, no other member for greatly absorbing or reflecting light is provided at positions of the aligning marks, thereby improving visibility of the marks.

It should be noted that the shapes of the marks are not limited to these, but, for example, a mark may be provided, as shown in FIG. 15, which stays within the first aligning mark 63 with a clearance of 10 μm inside the hollow part of the second aligning mark 64. It is needless to say that still another shape is also preferable. The case in which the aligning marks are provided at the lower right corner of the liquid crystal display panel is shown in FIG. 14, but they may be provided anywhere outside the display region 14.

By the way, the modification is applied to the sixth embodiment in the above explanation, but it is, of course, applicable to other embodiments.

<Method of Forming Color Filters>

As the method of forming the color filter, the case in which it is formed by the photolithography process is explained in the first embodiment and the case by the printing method is explained in the second embodiment. However, either method may be employed in each embodiment. When the color filter is formed on the substrate using a plastic film, it is preferably formed by the printing method.

As the printing method, a method is effective in which a color filter liquid is jetted from a plurality of inkjet nozzles to form a color filter in a short period of time. Further, a method of simultaneously printing color filters on the front face and the rear face of the same substrate is also effective. Especially when no second polarizer is required on the lower side of the second substrate, by simultaneously providing color filters on both sides of the second substrate, the color filters with good alignment accuracy can be formed.

When the second color filter is provided on the lower side of the second substrate, the second color filter can be formed after the liquid crystal layer is sealed between the first substrate and the second substrate, and then the liquid crystal display panel is made to be operable. In such a case, in the liquid crystal display panel for performing a display using two polarizers, the second color filter can be formed using the liquid crystal display panel.

For example, when portions of the R filters of the second color filter are formed, it is preferable that a material of the R filters composed of a negative photosensitive resin is applied to the second substrate, and the portions of the R filters of the first color filter are brought into a transmission state and other portions are brought into an absorption state (a reflection state when a reflective polarizer is used), and then exposure and development are performed. This step can insolubilize only the portions corresponding to the R filters of the first color filter out of the applied photosensitive resin to thereby form the R filters of the second color filter. When the transflective reflector is used, only light component which passes through the transflective reflector reaches the photosensitive resin even at the portions in the transmission state, which is also sufficient to expose the photosensitive resin.

Further, it is also possible to form the black matrix using the liquid crystal display panel. For example, in the case of the liquid crystal display panel in an absorption state (a reflection state when a reflective polarizer is used) where no voltage is applied, it is preferable that a positive photosensitive resin mixed with carbon (C) powder is applied to the second substrate, and voltage is applied to all the pixels to bring them into a transmission state, and then exposure and development are performed. This step enables formation of the black matrix having a light shielding property at the portions where voltage can not be applied to the liquid crystal layer.

The formation of the second color filter or the black matrix as described above can simplify process because of no alignment required.

When the first color filter is provided on the surface on the visible side of the second substrate and the second color filter is provided on the surface on the opposite side thereto, the thickness of the second substrate is important, and thus it is preferably as thin as durability allows. Also when the first color filter and the second color filter are simultaneously formed, or when the second color filter or the black matrix is formed using the liquid crystal display panel as described above, the thickness of the second substrate is preferably thin to improve the alignment accuracy.

Therefore, it is preferable to employ a plastic film substrate that can maintain durability even if it is made thin. In this case, it is ideal that the plastic film substrate transmits light with a wavelength longer than 320 nm, but a plastic film substrate, which transmits ultraviolet light with a wavelength longer than 350 nm, allows a photosensitive resin for the color filter to be exposed to light.

As is clear from the above explanation, according to the liquid crystal display panel of the invention, the first color filter and the second color filter are provided, whereby the reflection display can be performed using the first color filter, in which priority is given to brightness, and the transmission display can be performed using two layers of color filters of the second color filter, in which priority is given to chroma, and the first color filter, so that the transmission display with high brightness and high chroma can be performed with little decrease in brightness of the reflection display in the transflective liquid crystal display panel.

Use of such a liquid crystal display panel as a display panel of a liquid crystal display device or a timepiece enables improvement in display quality of these devices.

What is claimed is:

1. A liquid crystal display panel, comprising:
   a first substrate provided on a visible side;
   a second substrate opposed to said first substrate;
   a liquid crystal layer sandwiched between said first substrate and said second substrate;
   a first color filter provided in-between said first substrate and said second substrate;
   a transflective reflector, provided on an opposite side to said visible side of said liquid crystal layer and said first color filter, for transmitting a part of light and substantially reflecting all the remaining light; and
   a second color filter provided on an opposite side to said first color filter with respect to said transflective reflector;
   wherein said transflective reflector is provided on an opposite side to said visible side of said second substrate, and said second color filter is provided on an opposite side to said second substrate with respect to said transflective reflector.

2. A liquid crystal display panel according to claim 1, further comprising:

signal electrodes provided on said first substrate;

opposed electrodes provided on said second substrate to form pixel portions where said signal electrodes and said opposed electrodes coincide as viewed in a plan view; and a transflective reflector removed portion without providing said transflective reflector provided around a display region constituted of a plurality of said pixel portions.

3. A liquid crystal display panel according to claim 2, wherein said first color filter and said second color filter are constituted of filters of a plurality of colors respectively, and wherein said filters of different colors are arranged in said first color filter and said second color filter within a region of said transflective reflector removed portion.

4. A liquid crystal display panel according to claim 3, wherein said second color filter is constituted of filters of a plurality of colors, and wherein said second color filter is formed by laminating said filters of different colors within a region of said transflective reflector removed portion.

5. A liquid crystal display panel according to claim 2, further comprising:

a light shielding member having a reflectance lower than that of said transflective reflector and a light shielding property provided on said first substrate or on said second substrate within a region of said transflective reflector removed portion.

6. A liquid crystal display panel according to claim 1, wherein said transflective reflector has irregularities on a front face thereof and a light diffusing property.

7. A liquid crystal display panel according to claim 1, wherein said second color filter is provided contacting a surface on an opposite side to said visible side of said transflective reflector.

8. A liquid crystal display panel according to claim 1, wherein said first color filter and said second color filter have substantially same pixel pitch.

9. A liquid crystal display panel according to claim 8, wherein said first color filter and said second color filter are constituted of filters of a plurality of colors respectively, so that said filters of same color are arranged to coincide as viewed in a plan view in each pixel.

10. A liquid crystal display panel according to claim 1, further comprising:

signal electrodes provided on said first substrate; and opposed electrodes provided on said second substrate to form pixel portions where said signal electrodes and said opposed electrodes coincide as viewed in a plane view, wherein said transflective reflector is disposed on an opposite side to said visible side of said second substrate, said first color filter and said second color filter are provided at positions corresponding to said pixel portions respectively, said first color filter is constituted of filters of a plurality of colors which are different in color at portions corresponding to adjacent pixel portions, and said second color filter is provided with a light shielding layer at positions corresponding to gaps between adjacent pixel portions.

11. A liquid crystal display panel according to claim 1, wherein said first color filter and said second color filter have aligning marks respectively.

12. A liquid crystal display panel according to claim 1, further comprising:

signal electrodes provided on said first substrate;

opposed electrodes provided on said second substrate to form pixel portions where said signal electrodes and said opposed electrodes coincide as viewed in a plan view;

a first polarizer provided on said visible side of said first substrate;

a second polarizer provided on an opposite side to said visible side of said second substrate; and a white diffuser provided between said first substrate and said first polarizer, wherein said first color filter is constituted of filters of a plurality of colors corresponding to said pixel portions, and said transflective reflector is disposed on an opposite side to said visible side of said second substrate.

13. A liquid crystal display panel according to claim 1, wherein said liquid crystal layer is constituted of a scattering liquid crystal.

14. A liquid crystal display panel according to claim 13, further comprising an ultraviolet filtering film on said visible side of said first substrate, for absorbing or reflecting ultraviolet light.

15. A liquid crystal display panel according to claim 13, wherein said second substrate is a transparent plastic substrate or plastic film substrate.

16. A liquid crystal display panel according to claim 1, wherein said transflective reflector has a transmitting hole portion with a high transmittance and a reflecting portion with a high reflectance.

17. A liquid crystal display panel according to claim 16, further comprising:

signal electrodes provided on said first substrate; and opposed electrodes provided on said second substrate to form pixel portions where said signal electrodes and said opposed electrodes coincide as viewed in a plan view, wherein said transmitting hole portion of said transflective reflector is provided inside said pixel portion.

18. A liquid crystal display panel according to claim 17, wherein said second color filter is constituted of filters of a plurality of colors and overlapping portions where adjacent filters constituting said second filter overlap one upon another are provided between said pixel portions.

19. A liquid crystal display panel according to claim 18, wherein said first color filter is also constituted of filters of a plurality of colors and overlapping portions where adjacent filters constituting said first color filter overlap one upon another are provided between said pixel portions.

20. A liquid crystal display panel, comprising:

a first substrate provided on a visible side;

a second substrate opposed to said first substrate;

a liquid crystal layer sandwiched between said first substrate and said second substrate;

a first color filter provided inbetween said first substrate and said second substrate;

a transflective reflector, provided on an opposite side to said visible side of said liquid crystal layer and said first color filter, for transmitting a part of light and substantially reflecting all the remaining light; and a second color filter provided on the opposite side to said first color filter with respect to said transflective reflector;

wherein said first color filter, said transflective reflector and said second color filter are provided on a surface on said visible side of said second substrate in an order of said second color filter, said transflective reflector and said first color filter from said second substrate side.

21. A liquid crystal display panel according to claim 20, wherein said transflective reflector has a transmitting hole portion with a high transmittance and a reflecting portion with a high reflectance.

22. A liquid crystal display panel according to claim 21, further comprising:

signal electrodes provided on said first substrate and;

opposed electrodes provided on said second substrate to form pixel portions where said signal electrodes and said opposed electrodes coincide as viewed in a plan view, wherein said transmitting hole portion of said transflective reflector is provided inside said pixel portion.

23. A liquid crystal display panel according to claim 22, wherein said second color filter is constituted of filters of a plurality of colors and overlapping portions where adjacent filters constituting said second color filter overlap one upon another are provided between said pixel portions.

24. A liquid crystal display panel according to claim 23, wherein said first color filter is also constituted of filters of a plurality of colors and overlapping portions where adjacent filters constituting said first color filter overlap one upon another are provided between said pixel portions.

25. A liquid crystal display panel according to claim 20, further comprising:

signal electrodes provided on said first substrate;

opposed electrodes provided on said second substrate to form pixel portions where said signal electrodes and said opposed electrodes coincide as viewed in a plan view; and a transflective reflector removed portion without providing said transflective reflector provided around a display region constituted of a plurality of said pixel portions.

26. A liquid crystal display panel according to claim 25, wherein said first color filter and said second color filter are constituted of filters of a plurality of colors respectively, and wherein said filters of different colors are arranged in said first color filter and said second color filter within a region of said transflective reflector removed portion.

27. A liquid crystal display panel according to claim 25, wherein said second color filter is constituted of filters of a plurality of colors, and wherein said second color filter is formed by laminating said filters of different colors within a region of said transflective reflector removed portion.

28. A liquid crystal display panel according to claim 25, further comprising:

a light shielding member having a reflectance lower than that of said transflective reflector and a light shielding property provided on said first substrate or on said second substrate within a region of said transflective reflector removed portion.

29. A liquid crystal display panel according to claim 20, wherein said transflective reflector has irregularities on a front face thereof and a light diffusing property.

30. A liquid crystal display panel according to claim 20, wherein said first color filter and said second color filter have substantially the same pixel pitch.

31. A liquid crystal display panel according to claim 30, wherein said first color filter and said second color filter are constituted of filters of a plurality of colors respectively, so that said filters of same color are arranged to coincide as viewed in a plan view in each pixel.

32. A liquid crystal display panel according to claim 20, further comprising:

signal electrodes provided on said first substrate; and opposed electrodes provided on said second substrate to form pixel portions where said signal electrodes and said opposed electrodes coincide as viewed in a plane view, wherein said transflective reflector is disposed on an opposite side to said visible side of a said second substrate, said first color filter and said second color filter are provided at positions corresponding to said pixel portions respectively, said first color filter is constituted of filters of a plurality of colors which are different in color at portions corresponding to adjacent pixel portions, and said second color filter is provided with a light shielding layer at positions corresponding to gaps between adjacent pixel portions.

33. A liquid crystal display panel according to claim 20, wherein said transflective reflector has an optical polarizing characteristic.

34. A liquid crystal display panel according to claim 20, wherein said first color filter and said second color filter have aligning marks respectively.

35. A liquid crystal display panel according to claim 20, further comprising:

signal electrodes provided on said first substrate;

opposed electrodes provided on said second substrate to form pixel portions where said signal electrodes and said opposed electrodes coincide as viewed in a plan view;

a first polarizer provided on said visible side of said first substrate;

a second polarizer provided on the opposite side to said visible side of said second substrate; and a white diffuser provided between said first substrate and said first polarizer, wherein said first color filter is constituted of filters of a plurality of colors corresponding to said pixel portions, and said transflective reflector is disposed on an opposite side to said visible side of said seconds substrate.

36. A liquid crystal display panel according to claim 20, wherein said liquid crystal layer is constituted of a scattering liquid crystal.

37. A liquid crystal display panel according to claim 36, further comprising an ultraviolet filtering film on said visible side of said first substrate, for absorbing or reflecting ultraviolet light.

38. A liquid crystal display panel according to claim 30, wherein said second substrate is a transparent plastic substrate or plastic film substrate.

39. A liquid crystal display panel, comprising:

a first substrate provided on a visible side;

a second substrate opposed to said first substrate;

a liquid crystal layer sandwiched between said first substrate and said second substrate;

a first color filter provided inbetween said first substrate and said second substrate;

a transflective reflector, provided on an opposite side to said visible side of said first color filter, for transmitting a part of light and substantially reflecting all the remaining light; and a second color filter provided on the opposite side to said first color filter with respect to said transflective reflector;

wherein said transflective reflector has a transmitting hole portion with a high transmittance and a reflecting portion with a high reflectance, said transflective reflector is provided on the opposite side to said visible side of said second substrate, and said second color filter is provided on an opposite side to said second substrate with respect to said transflective reflector, and said second color filter is provided contacting a surface on an opposite side to said visible side of said transflective reflector.

40. A liquid crystal display panel comprising:

a first substrate provided on a visible side;

a second substrate opposed to said first substrate;

a liquid crystal layer sandwiched between said first substrate and said second substrate;

a first color filter provided on said first substrate or on said second substrate;

a transflective reflector, provided on an opposite side to said visible side of said first color filter, for transmitting a part of light and reflecting almost all remaining light; and a second color filter provided on an opposite side to said first color filter with respect to said transflective reflector;

wherein said transflective reflector has a transmitting hole portion with a high transmittance and a reflecting portion with a high reflectance;

wherein said transflective reflector is provided on an opposite side to said visible side of said second substrate, and said second color filter is provided on an opposite side to said second substrate with respect to said transflective reflector;

wherein said second color filter is provided contacting a surface on an opposite side to said visible side of said transflective reflector.

* * * * *

UNITED STATES PATENT AND TRADEMARK OFFICE
CERTIFICATE OF CORRECTION

PATENT NO.    : 6,690,438 B2
DATED         : February 10, 2004
INVENTOR(S)   : Kanetaka Sekiguchi It is certified that error appears in the above-identified patent and that said Letters Patent is hereby corrected as shown below:

Column 27,
Line 18, delete "claim 3" and insert -- claim 2 --.

Column 31,
Line 1, delete "claim 30" and insert -- claim 36 --.

Signed and Sealed this

Thirteenth Day of July, 2004

JON W. DUDAS
*Acting Director of the United States Patent and Trademark Office*